United States Patent
Rasmusson et al.

(10) Patent No.: US 8,396,309 B2
(45) Date of Patent: Mar. 12, 2013

(54) INDEX-BASED PIXEL BLOCK PROCESSING

(75) Inventors: Jim Rasmusson, Vellinge (SE); Tomas Akenine-Möller, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 171 days.

(21) Appl. No.: 12/994,516

(22) PCT Filed: May 13, 2009

(86) PCT No.: PCT/EP2009/055758
§ 371 (c)(1), (2), (4) Date: Jan. 31, 2011

(87) PCT Pub. No.: WO2009/150004
PCT Pub. Date: Dec. 17, 2009

(65) Prior Publication Data
US 2011/0116723 A1 May 19, 2011

Related U.S. Application Data

(60) Provisional application No. 61/056,232, filed on May 27, 2008.

(30) Foreign Application Priority Data

Nov. 14, 2008 (EP) ...................................... 08169172

(51) Int. Cl.
*G06K 9/36* (2006.01)
*G06K 9/46* (2006.01)
(52) U.S. Cl. ....................................................... 382/238
(58) Field of Classification Search .................. 382/232, 382/233, 238, 240, 250; 358/1.9, 470; 375/240.13, 375/240.22, 245, 250, 252, E7.14, E7.205; 341/65, 76, 200; 348/394.1, 414.1
See application file for complete search history.

(56) References Cited

U.S. PATENT DOCUMENTS

| | | | | |
|---|---|---|---|---|
| 4,075,655 A | * | 2/1978 | Iijima et al. | 348/394.1 |
| 4,815,078 A | * | 3/1989 | Shimura | 714/746 |
| 4,979,187 A | * | 12/1990 | Aoki et al. | 375/245 |
| 5,166,987 A | | 11/1992 | Kageyama | |
| 5,757,306 A | * | 5/1998 | Nomura | 341/200 |
| 6,865,298 B2 | * | 3/2005 | Li | 382/238 |
| 2002/0118884 A1 | | 8/2002 | Cho et al. | |

(Continued)

FOREIGN PATENT DOCUMENTS

EP 0947104 B1 11/2002

OTHER PUBLICATIONS

Author Unknown. "Proposal of Encoding Algorithm of MPEG." International Organization for Standardization, ISO/IED JTC1/SC2/WG11, Coding of Moving Pictures and Associated Video, ISO/JEC JTEC1/SC2/WG11 MPEG91/226, Nov. 1991.

(Continued)

*Primary Examiner* — Amir Alavi
(74) *Attorney, Agent, or Firm* — Coats & Bennett, P.L.L.C.

(57) ABSTRACT

A pixel block is compressed by determining a reference set of multiple reference property values. A value index associated with a reference property value of the reference set is assigned to each pixel in the pixel block based on the original property value of the pixel. A prediction of the value index is provided based on the value index assigned to at least one neighboring pixel in the pixel block. A prediction error is calculated based on the value index assigned to a pixel and its value index prediction. The compressed pixel block includes encoded representations of the prediction errors and an encoded representation of the reference set.

12 Claims, 10 Drawing Sheets

U.S. PATENT DOCUMENTS

2011/0116723 A1* 5/2011 Rasmusson et al. .......... 382/238

OTHER PUBLICATIONS

Kuo, C.-H. et al. "A Prequantizer with the Human Visual Effect for the DPCM." Signal Processing: Image Communication, Elsevier Science Publishers, Amsterdam, the Netherlands, vol. 8, 1996, pp. 433-442.

Sayood, K. Introduction to Data Compression, 2nd Ed, Chapter 8 "Scalar Quantization," Section 8.6 "Nonuniform Quantization," Morgan Kaufmann, Jan. 1, 2000, p. 238.

* cited by examiner

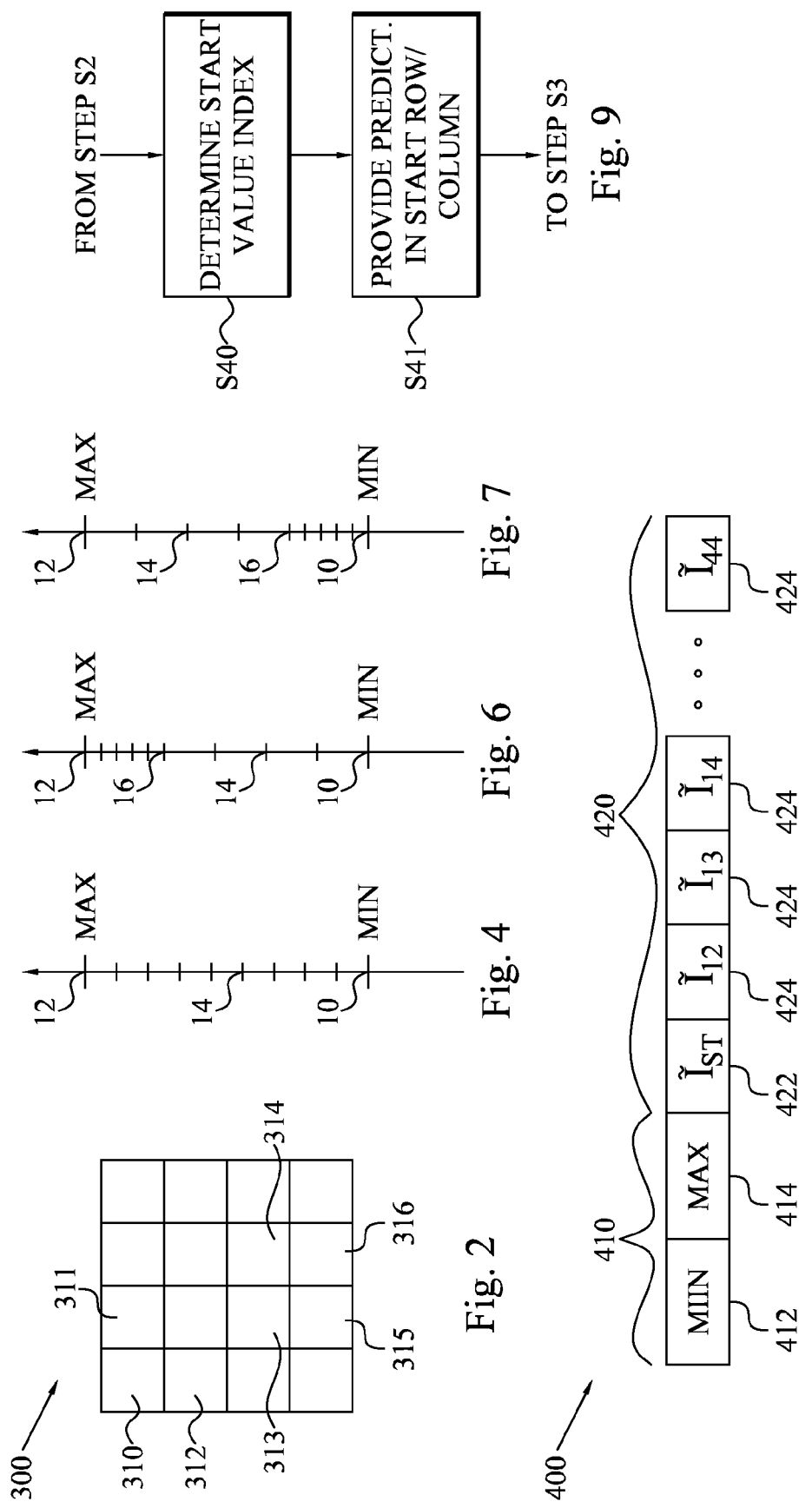

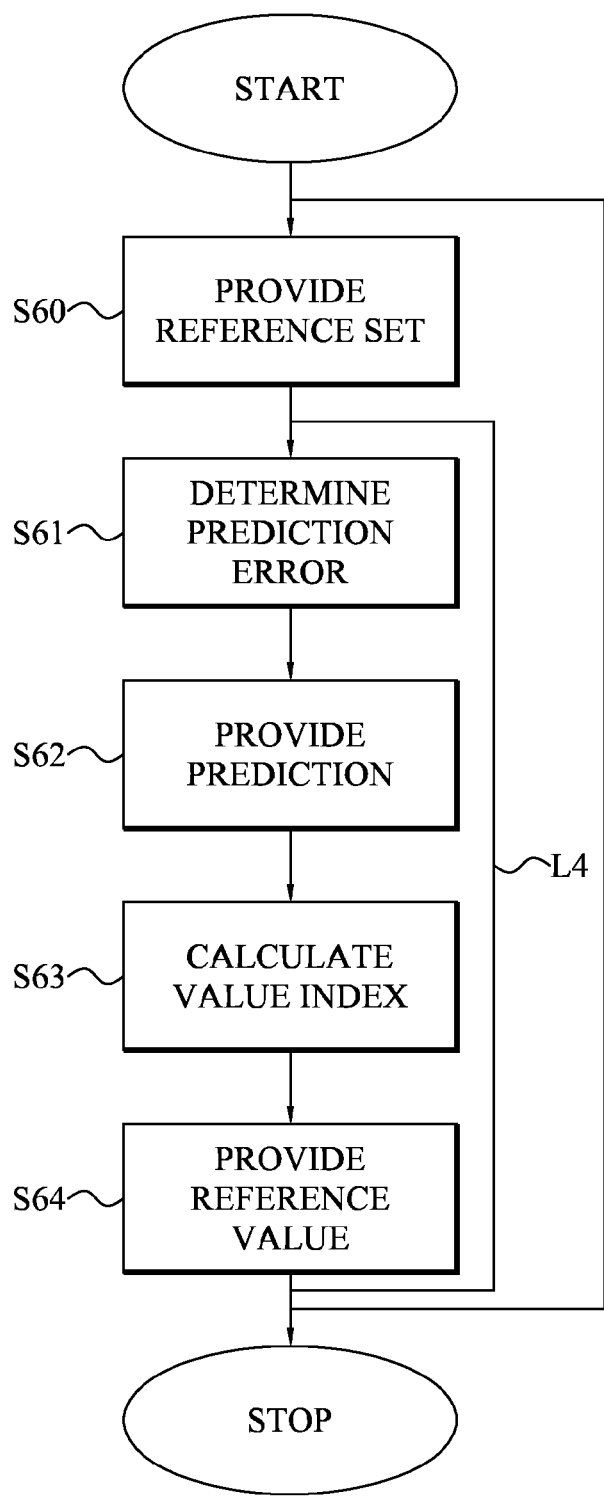
Fig. 12
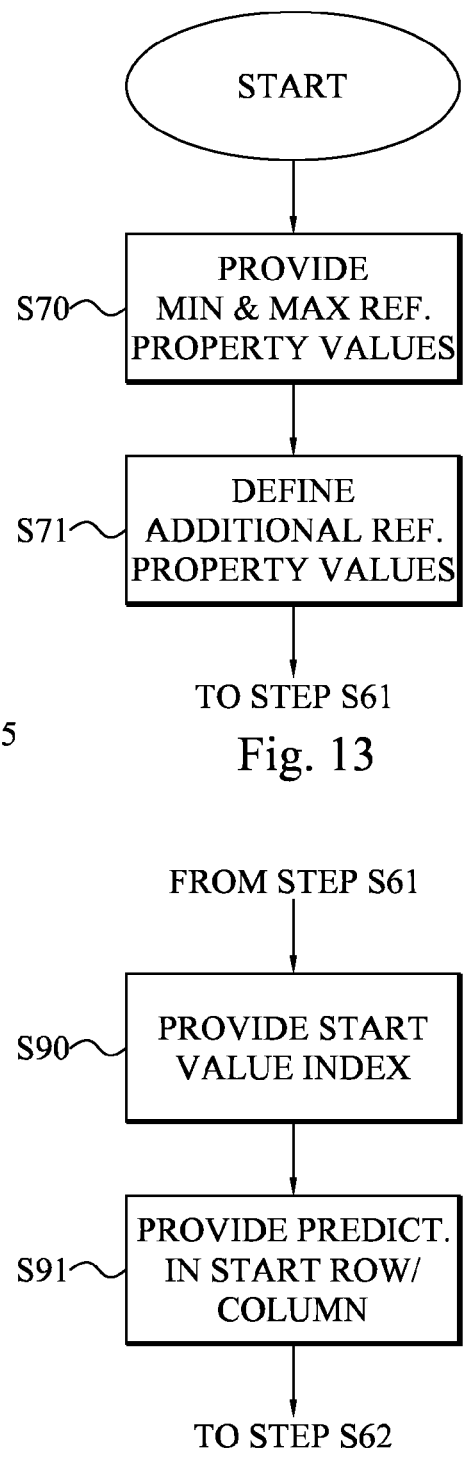
Fig. 13
Fig. 15

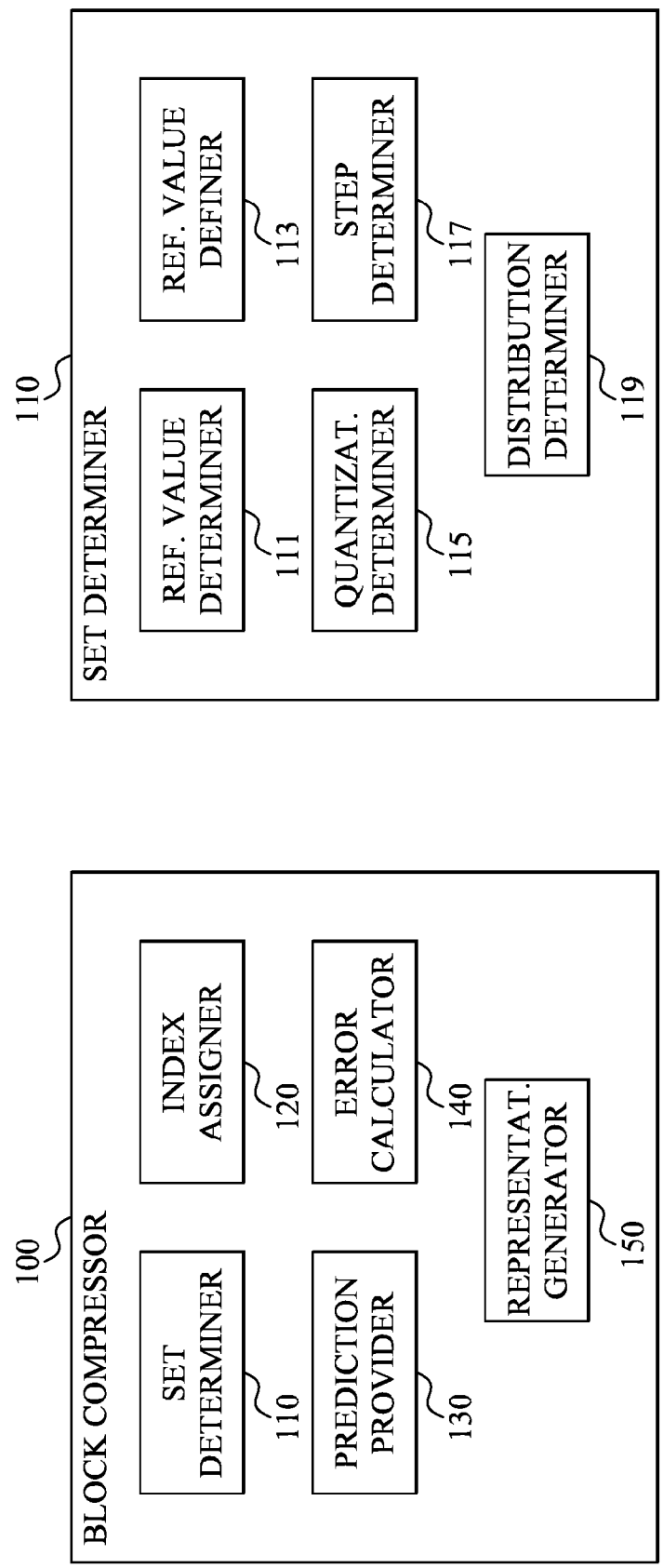

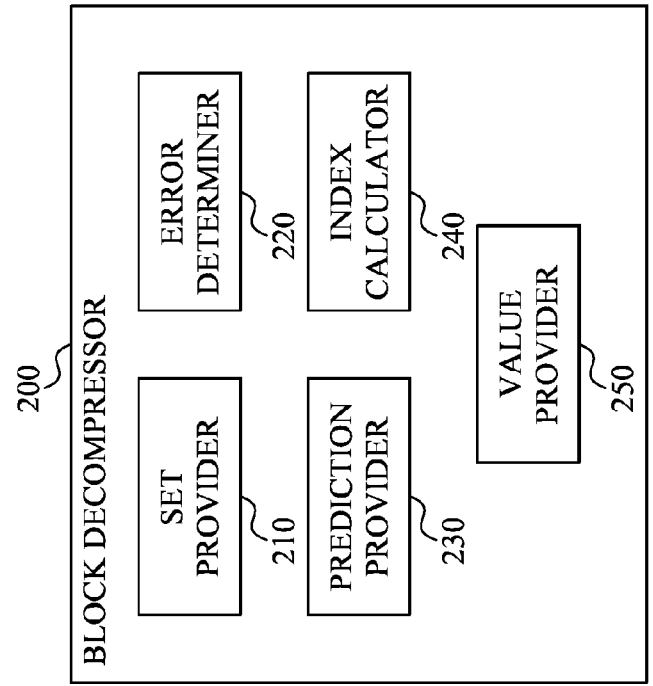
Fig. 21
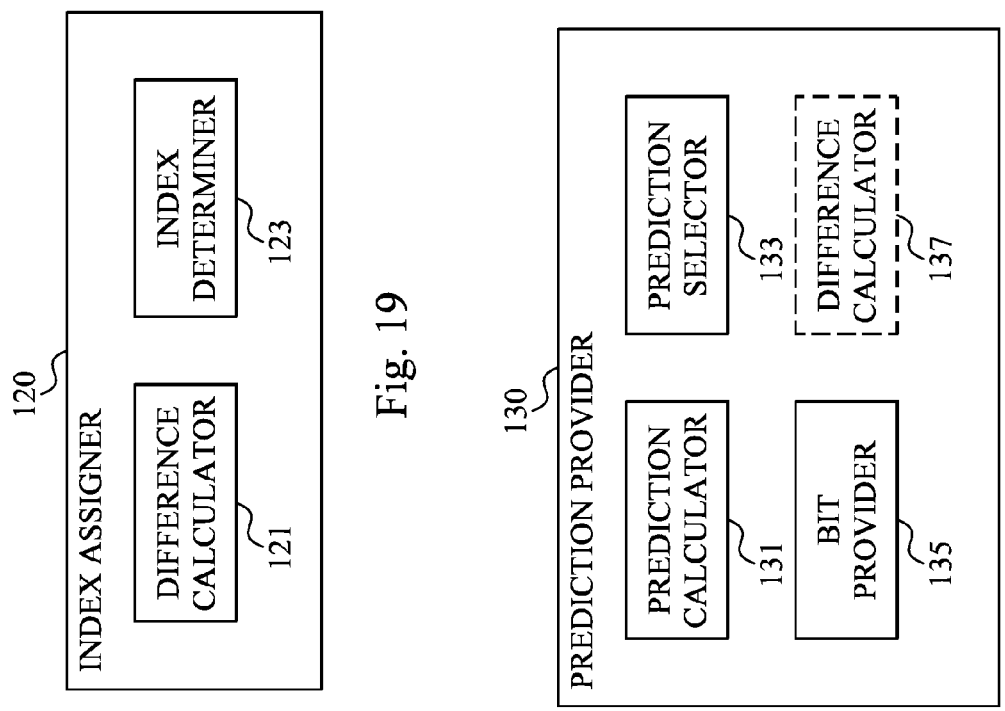
Fig. 19
Fig. 20

INDEX-BASED PIXEL BLOCK PROCESSING

This application is a 371 of PCT/EP2009/055758 May 13, 2009, which claims benefit of 61/056,232 May 27, 2008.

TECHNICAL FIELD

The present invention generally relates to pixel block processing, and in particular to index-based compression and decompression of pixel blocks.

BACKGROUND

In order to increase performance for graphics processing units (GPUs), memory bandwidth reduction techniques are employed. One such way to decrease the bandwidth requirements is to perform what is called buffer compression. A graphics system typically uses at least two buffers: a color buffer where the colors of the pixels are drawn and a depth buffer where the depth of each pixel is stored. During rendering these buffers are read and written to, and often the same pixel is accessed several times for both buffers. These read and write accesses are expensive in terms of energy and should therefore be kept to a minimum, in particular for user terminals with limited power supply, such as mobile devices.

Buffer compression implies that blocks of buffer data is stored in memory in compressed form. Documents [1] and [2] give good overviews of prior art color buffer compression and depth buffer compression, respectively.

Buffer data leads to an important problem as it may involve sharp edges between the drawn triangle and the background. Traditional buffer data techniques may run into problems when having a prediction-based buffer compression by predicting over the edge of such discontinuities.

There is a need for an efficient technique for compression and decompression of pixel blocks and in particular such pixel blocks carrying buffer data.

SUMMARY

The present embodiments provide an efficient technique in compressing and decompressing pixels blocks and therefore overcome drawbacks of the prior art arrangements.

It is a general objective to provide an efficient pixel block compression and decompression.

This and other objects are met by the embodiments as defined by the accompanying patent claims.

Briefly, the present invention involves an index-based and prediction-based compression and decompression of pixel blocks. In the compression, a reference set is determined for a pixel block comprising multiple pixels to be compressed. The reference set defines multiple reference property values. A respective value index is assigned to each pixel in the pixel block based on the original property value of the pixel. The value index furthermore allows identification of one of the reference property values in the reference set.

The compression continues by providing a prediction of the value index assigned to a pixel in the pixel block. This prediction is determined based on the value index assigned to at least one neighboring pixel in the pixel block.

A prediction error is calculated from the value index assigned to the pixel and the provided prediction. The final compressed pixel block comprises encoded, for instance entropy encoded, representations of the prediction errors in addition to an encoded representation of the reference set.

During decompression a reference set of multiple reference property values is determined based on the encoded representation of the reference set comprised in the compressed pixel block. The encoded representation of a prediction error of a pixel is retrieved and decoded to get the prediction error value.

A prediction of a value index of the pixel is provided based on the value index assigned to at least one neighboring pixel that has already been decompressed in the pixel block. The value index of the pixel can then be determined based on the provided prediction and the determined prediction error.

The value index allows identification of a reference property value from the reference set. This identified reference property value is assigned as decoded representation of the original property value of the pixel.

A block compressor and a block decompressor are also defined herein.

SHORT DESCRIPTION OF THE DRAWINGS

The embodiments together with further objects and advantages thereof, may best be understood by making reference to the following description taken together with the accompanying drawings, in which:

FIG. 2 is a schematic illustration of a pixel block according to an embodiment;

FIG. 4 is a schematic illustration of generation of a reference set of multiple reference property values according to an embodiment;

FIG. 6 is a schematic illustration of generation of a reference set of multiple reference property values according to another embodiment;

FIG. 7 is a schematic illustration of generation of a reference set of multiple reference property values according to a further embodiment;

FIG. 9 is a flow diagram illustrating additional, optional steps of the pixel block compression method in FIG. 1;

FIG. 11 is a schematic illustration of a compressed pixel block according to an embodiment;

FIG. 12 is a flow diagram illustrating a method of decompressing a compressed pixel block according to an embodiment;

FIG. 13 is a flow diagram illustrating an embodiment of the set providing step in FIG. 12;

FIG. 15 is a flow diagram illustrating additional, optional steps of the pixel block decompression method in FIG. 12;

FIG. 17 is a schematic block diagram of a block compressor according to an embodiment;

FIG. 18 is a schematic block diagram of an embodiment of the set determiner in FIG. 17;

FIG. 19 is a schematic block diagram of an embodiment of the index assigner in FIG. 17;

FIG. 20 is a schematic block diagram of an embodiment of the prediction provider in FIG. 17;

FIG. 21 is a schematic block diagram of a block decompressor according to an embodiment;

DETAILED DESCRIPTION

Figure 1:
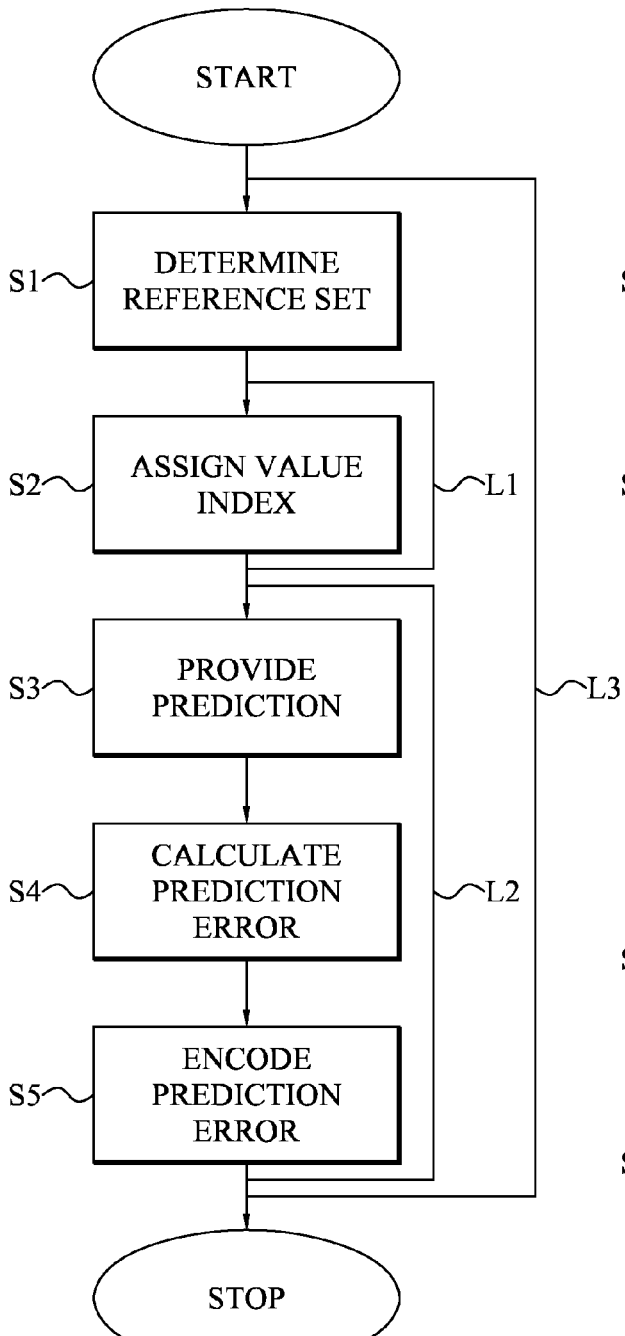
FIG. 1 is a flow diagram illustrating a method of compressing a pixel block according to an embodiment.

Throughout the drawings, the same reference characters will be used for corresponding or similar elements.

The present embodiments generally relate to compression and decompression of pixel property values, and in particular such a compression and decompression suitable for buffer compression and decompression.

Buffer compression/decompression can be used in three-dimensional (3D) graphics, such as games, 3D maps and scenes, 3D messages, e.g. animated messages, screen savers, man-machine interfaces (MMIs), etc., but is not limited thereto. Thus, the embodiments could also be employed for processing other types of images or graphics, e.g. one-dimensional (1D), two-dimensional (2D) or 3D images.

The compression and decompression collectively handles a plurality of pixels, typically in the form of a block or a tile of pixels. In an embodiment, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such pixel block embodiments could be 4×4 pixels, 8×8 pixels or 16×16 pixels.

A pixel block corresponds to a portion of an image, texture or buffer. A pixel constitutes a block element of such a pixel block and can, for instance, be a texel (texture element) of a (1D, 2D, 3D) texture, a pixel of a (1D or 2D) image or a voxel (volume element) of a 3D image. Generally, a pixel is characterized with an associated pixel parameter or property value. There are different such property values that can be assigned to pixels, typically dependent on what kind of pixel block to compress/decompress. For instance, the property value could be a color component value assigned to the pixel. As is well known in the art, different color spaces are available and can be used for representing pixel color values. A usual such color space is the so-called red, green, blue (RGB) color space. A pixel property value could therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces in the art include YUV, $YC_oC_g$ and $YC_rC_b$. A property value can therefore also be a luminance value (Y) or a chrominance value (U, V, $C_o$, $C_g$, $C_r$ or $C_b$). In the case of compressing/decompressing pixel blocks of a color buffer, RGB colors of pixels are preferably converted into the luminance/chrominance color space. This not only decorrelates the RGB data leading to improved compression rates but also allows the possibility of having different compression strategies for the luminance and chrominance components. Thus, as the human visual system is more susceptible to errors in the luminance component, the chrominance components can typically be compressed more aggressively than the luminance component.

A particular color space transform to use is the $YC_oC_g$ transform disclosed in document [3]. This transform has low implementation complexity, i.e. is highly silicon-efficient, and provides good decorrelation. A further important feature is that is reversible: transforming the $YC_oC_g$ values back to RGB recreates the RGB values bit-exactly. The transform is defined as:

$$C_o=R-B$$

$$t=B+(C_o>>1)$$

$$C_g=G-t$$

$$Y=t+(C_g>>1)$$

The reverse transform is:

$$t=Y-(C_g>>1)$$

$$G=C_o+t$$

$$B=t-(C_o>>1)$$

$$R=B+C_o$$

where >> denotes bitwise right shift.

The present embodiments are though not limited to compressing/decompressing pixel blocks where the pixels have assigned color component values or luminance/chrominance values as property values. In clear contrast, the embodiments can also be used in connection with, for instance, depth buffer compression/decompression. Then each pixel of a pixel block has a so-called depth value or Z value as property value.

Thus, the embodiments herein can indeed be used in compressing/decompressing pixel blocks where the included pixels have any pixel property feature available in the art. In the following, the embodiments are, though, mainly discussed further in connection with color buffer compression, where each pixel has, following color space transformation, a luminance value and at least one chrominance value. This should however merely be seen as an illustrative, but non-limiting, example of the scope of the invention.

The embodiments can be used for processing property values in any bit-resolution, including so-called low dynamic range (LDR) and high dynamic range (HDR) property values. The former is typically represented by a limited solution of an 8-bit integer per color component in the art. In clear contrast HDR generally involves representing property values using floating-point numbers, such as fp16 also known as halfs, fp 32 as known as floats or fp64 also known as doubles.

The floating-point nature of halfs, floats and doubles, however, leads to problems. Since the density of floating-point numbers is not uniform, the difference between two halfs, floats or doubles may not be representable as a half, float or double with the same precision. This problem of floating-point numbers is solved by mapping each floating-point number to a respective integer representation. This basically corresponds to assigning, to each floating-point number, a unique integer number. Thus, the mapping from floating-point to integer domain involves assigning ever higher integer numbers to the ever higher floating-point number. This means that 0.0 will be assigned integer representation 0, the next smallest positive floating-point number is assigned 1, the second next smallest floating-point number is assigned 2 and so on. The floating point to integer mapping is adapted for handling positive floating point numbers. If a pixel block comprises a negative floating point number, that pixel block can be left uncompressed.

Doing the calculations and arithmetic in the integer domain also avoids costly floating-point operations. Furthermore, since the compression may be lossless, a correct handling of NaN (Not a Number), Inf (Infinity) and denorms (denormal numbers) is also obtained. In such a case, during compression the floating-point numbers are interpreted as integers according to the above-presented mapping. Following decompression, the integer numbers are then re-interpreted back into floating-point numbers through the one-to-one mapping between integer and floating-point numbers described above.

The embodiments disclose prediction-based pixel block compression or coding and decompression or decoding.

Compression

FIG. 1 is a flow diagram illustrating a method of compressing a pixel block comprising multiple pixels according to an embodiment. Each pixel of the pixel block has at least one respective pixel property value, such as a luminance value and two chrominance values. The compression described herein discloses the compression of one such property value. If the pixels have multiple types property values, such as R, G, B color values or luminance and two different chrominance values, the compression is basically performed sequentially or in parallel for each of the property value types.

The method generally starts in step S1, where a reference set for the current pixel block is determined. This reference set comprises multiple reference property values that are used as predictions for the original property values in the pixel block. In some particular applications, the reference set can be fixed, thereby having a fixed number of reference property values and these multiple reference property values are furthermore identical for each pixel block to be compressed. Such an application is, however, merely of limited practical use when the original property values are all within a small, defined value interval. Therefore, in most practical applications the reference property values in the reference set are preferably determined based on at least a portion of the property values of the pixel block.

A next step S2 assigns, for each pixel in the pixel block, a value index associated with one of the reference property values in the determined reference set. The value index is defined to allow identification of one of the reference property values in the reference set. For instance, if the reference set comprises eight different reference property values, the value index can be a 3-bit word ranging from $000_{bin}$ to $111_{bin}$. Thus, the length of the value index can be variable and in turn depends on the number of reference property values in the reference set.

The value index is furthermore assigned to the pixel based on the property value of the pixel. Thus, the value index preferably points to the reference property value that is closest to the property value of the pixel, i.e. minimizes $|P_{ij}-RP_k|$, where $P_{ij}$ denotes the property value of the pixel at position i,j in the pixel block and $RP_k$ represents a reference property values with k=0,1, K, $N_{RP}-1$ and $N_{RP}$ denotes the total number of reference property values in the reference set.

As was previously mentioned, a value index is preferably assigned for each pixel in the pixel block, which is schematically illustrated by the line L1 in the figure.

The next step S3 provides a prediction of the value index assigned for a pixel in step S2. This prediction is determined based on the value index assigned to at least one neighboring pixel in the pixel block. This at least one neighboring pixel is furthermore positioned at a previous position in the pixel block relative the current pixel when traveling in compressing/decompressing order, i.e. typically left to right and top to bottom. As is further disclosed herein, the prediction can be determined based on the value index of one neighboring pixel or based on the value indices of multiple neighboring pixels in different prediction directions.

A prediction error is calculated for the pixel based on the assigned value index and the provided prediction in step S4. The prediction error is typically calculated as a difference between the property value and the prediction, $\tilde{I}_{ij}=I_{ij}-\hat{I}_{ij}$, where $\tilde{I}_{ij}$ is the prediction error for the pixel at pixel position i,j in the pixel block, $\hat{I}_{ij}$ is the prediction for the pixel and $I_{ij}$ is the value index assigned for the pixel.

The next step S5 generates an encoded representation of the prediction error by encoding it. The compressed pixel block then comprises this encoded representation of the prediction error. The steps S3 to S5 are preferably performed for at least a subset of the pixels in the pixel block, such as for each pixel excluding the first pixel, which is used as starting pixel as is further discussed herein. This is schematically illustrated by the line L2. In such a case the compressed pixel block comprises these encoded representations of the prediction errors.

In a preferred embodiment, the compressed pixel block also comprises an encoded representation of the reference set determined in step S1. In the case there are multiple different available pre-defined reference sets, the encoded representation can be a set index associated with a reference set selected in step S1. Alternatively, the encoded representation of the reference set can include the reference property values of the determined reference set. However, such an approach costs a lot of bits and results in long compressed pixel blocks in terms on the number of bits. A more preferred implementation, is therefore to only include a subset of the reference property values, such as two of them, whereby remaining reference property values in the reference set can be calculated from this subset.

The procedure of steps S1 to S5 is run in parallel or in sequence for each property value type available for the pixels. This means that the procedure may be run once or multiple for each pixel block.

The compression method of step S1 to S5 in FIG. 1 is preferably repeated for each pixel block to be compressed, which is schematically illustrated by the line L3. Note that in a preferred implementation, each pixel block has an individually determined reference set provided based on the particular property values of that pixel block. This means that different reference sets are typically used for different pixel blocks even though, depending on the property values of the pixel blocks, two pixel blocks may indeed happen to have the same determined reference set.

FIG. 2 is a schematic illustration of a pixel block 300 of multiple pixels 310-316. In this illustrative example, the pixel block 300 is a 4×4 pixel block 300. This should, however, merely be seen as a non-limiting embodiment and other pixel block sizes can alternatively be used as described herein.

Figure 3:
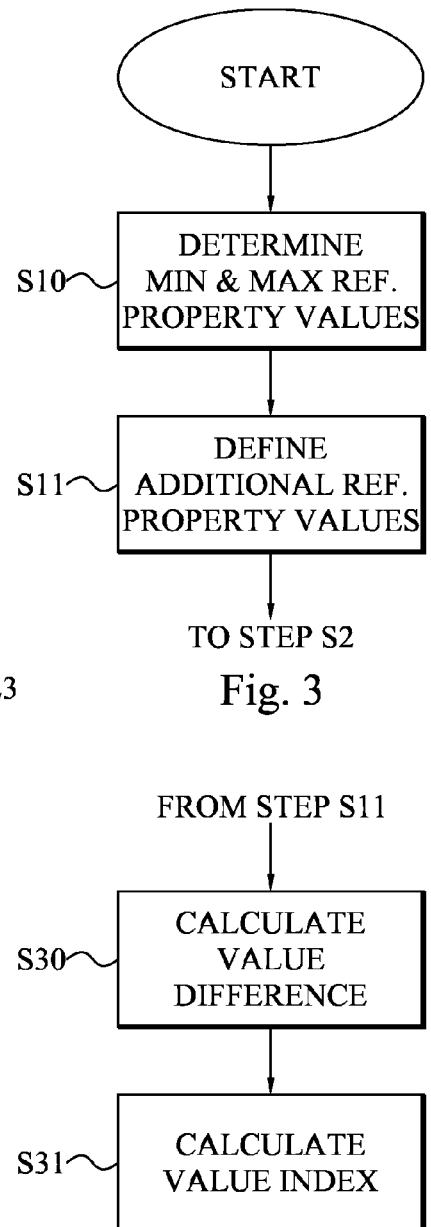
FIG. 3 is a flow diagram illustrating an embodiment of the set determining step in FIG. 1.

FIG. 3 is a flow diagram illustrating an embodiment of the set determining step of FIG. 1. The method starts in step S10, where a minimum and a maximum reference property value are determined based on at least a portion of the property values in the block. This step S10 typically involves identifying the smallest property value in the pixel block and determining the minimum reference property value to be equal to or at least be determined based on this smallest property value. Correspondingly, the maximum reference property value is preferably equal to or at least determined based on the largest property value in the pixel block.

At least one additional reference property value is defined in step S11 based on the determined minimum and maximum reference property values. The at least one additional reference property value is preferably defined to be a linear combination of the minimum and maximum reference property values.

Step S11 preferably defines multiple additional reference property values, which then are different linear combinations of the minimum and maximum reference property values.

The reference set comprises the determined minimum and maximum reference property values and the at least one, preferably multiple, additional reference property values. The method then continues to step S2 of FIG. 1. The compressed pixel block generated according to the compression method of FIG. 1 comprises an encoded representation of the minimum reference property value and an encoded representation of the maximum reference property values. For instance, the compressed pixel block can comprise the bit words corresponding to the values of the minimum and maximum reference property values, possibly quantized to a limited, predefined bit resolution, i.e. length of the bit word. Alternatively, the compressed pixel block comprises the bit word corresponding to one of the minimum and maximum reference property values and an offset representation indicating the difference between the maximum and minimum reference property values.

FIG. 4 is a graphical representation of this concept of defining the reference set. The figure illustrates the maximum reference property values 12 and the minimum reference property values 10. In this embodiment, the additional reference property values 14 are provided as equidistanced or uniform linear combinations of the minimum property value 10 and the maximum property value 12 and are provided in the interval defined by these end values 10, 12.

The number of additional reference property values is preferably defined based on a determined quantization parameter. In such a case, the quantization parameter limits the number of available additional reference property values in the reference set. Thus, the additional reference property values may be defined as $$RP_k = \frac{(Q-k) \times RP_{min} + k \times RP_{max}}{Q},$$

where $RP_{min}$ denotes the minimum reference property value, $RP_{max}$ denotes the maximum reference property value, Q is the quantization parameter and k=1, 2, K, Q−1.

In an alternative approach, the difference between the maximum and minimum reference property values is calculated. The number of bits required for representing this difference is furthermore defined. For instance, assume that the maximum reference property value is 875 and the minimum reference property value is 20, then the difference is 875−20=855 or $1101010111_{bin}$. Thus, 10 bits are required to code this difference. This means that in order to code property values of the pixel block as an offset from the minimum reference property value or the maximum reference property value in a bit exact manner, 10 bits are required for the pixels in this particular example. However, in order to achieve a higher compression ratio the offset values are preferably approximated by reducing the number of available offset values. Thus, in this case, the quantization parameter Q is determined to be a value smaller than 10.

A particular embodiment calculates the quantization parameter to be based on the determined number of bits required for representing the difference, such as $$Q = \max\left(1, \frac{bit(RP_{max} - RP_{min})}{2}\right),$$

where max( ) returns the largest value of the input values, bit( ) returns the number of bits of its input value and integer division by, in this case 2, is used. This results in roughly half the number of bits and works well in practice. The above disclosed functions for calculating a quantization parameter should merely be seen as illustrative examples and the embodiments are not limited thereto. Actually any suitable function determining a quantization parameter that is smaller than $bit(RP_{max}-RP_{min})$ can be used. Such a function can be determined in an optimization procedure using different input pixel blocks with the goal of achieving a reasonable balance between compression ratio and quality in terms of peak signal to noise ratio (PSNR) or some other quality metric.

A step parameter is determined based on the quantization parameter. Thus, the calculated quantization parameter Q basically divides the interval between the maximum reference property value and the minimum reference property value in $2^Q$ steps. The step parameter is, in this embodiment, defined as the step size of these steps, such as S=1<<(bits $(RP_{max}-RP_{min})$−Q), where << denotes bitwise left shift. This is equivalent of having a step size of $S=2^{(bits(RP_{max}-RP_{min})-Q)}$.

This step size is used for representing, with the minimum reference property value or the maximum property value, the additional reference property values.

Figure 8:
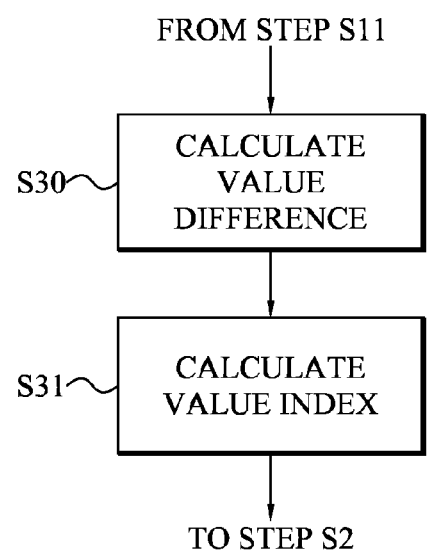
FIG. 8 is a flow diagram illustrating additional, optional steps of the set determining step.

In a particular embodiment as is illustrated in FIG. 8, the value index of a pixel is calculated by first calculating the difference between the property value of the pixel and the minimum reference property value or the difference between the maximum reference property value and the property value of the pixel in step S30. The value index is then calculated in step S31 as $$I_{ij} = \text{round}\left(\frac{P_{ij} - RP_{min}}{S}\right)$$

or the corresponding equation when using the maximum reference property value instead of the minimum reference property value. If the property value of the pixel is equal to the maximum reference property value or the minimum property value, the value index is set equal to a max or min index.

Note that if a pixel has a luminance value and chrominance values, different quantization parameters can be used for the luminance and chrominance values. Generally, the quantization can be stronger, e.g. larger step parameter, for the chrominance components than the luminance component as the human visual system is less susceptible to errors in the chrominance components.

In the embodiments exemplified above, a uniform distribution of the additional reference property values in the interval defining by the maximum and minimum reference property values is used. However, in some cases the original property values in the pixel block may not necessarily be uniformly distributed in this interval. In clear contrast, the property values may, for instance, be more densely distributed close to one of the ends of the interval or the middle of the interval and are therefore more sparsely found in remaining portions of the interval. Such a non-uniform distribution of property values may be processed differently in order to increase the accuracy and quality of the compression method. This is schematically illustrated in the additional steps of FIG. 5.

The method continues from step S10 of FIG. 3. A next step determines the distribution of the property values of the pixel in the max-to-min interval. This can, for instance, be implemented by calculating, for each pixel in the pixel block, the distance to both the maximum and minimum reference property values: $\Delta_{ij}^{min}=P_{ij}-RP_{min}$ and $\Delta_{ij}^{max}=RP_{max}-P_{ij}$. If the property value of the pixel is more close to the minimum reference property value, i.e. $\Delta_{ij}^{min} < \Delta_{ij}^{max}$, the pixel could be marked with $0_{bin}$. If this condition is not met, the pixel is instead marked with $1_{bin}$. Alternatively, the opposite marking is used, i.e. $1_{bin}$ indicates $\Delta_{ij}^{min} < \Delta_{ij}^{max}$. Once all pixels have been classified in this way, the value distribution can be determined.

The pixel block is defined as having a dense distribution close to the minimum reference property values if the number of $0_{bin}$ exceeds a predefined percentage of the total number of pixels in the pixel block, such as 75%. Correspondingly, the pixel block is defined as having a dense distribution close the maximum reference property values if the number of $1_{bin}$ according to the classification exceeds a predefined percentage of the total number of pixels in the pixel block, such as 75%.

Thus, step S21 investigates whether at least the minimum portion of the property values, 75%, is within a predefined sub-interval close to the maximum reference property value, i.e. in this case the interval $$\left[ \frac{RP_{max} - RP_{min}}{2}, RP_{max} \right].$$

If this condition is not met, the method continues to step S22. Step S22 instead investigates whether a minimum portion of the property values is within a predefined sub-interval close to the minimum reference property value, i.e. in the case the interval $$\left[ RP_{min}, \frac{RP_{max} - RP_{min}}{2} \right].$$

If the condition is not met, the pixel block is regarded as having a fairly homogenous distribution of property values in the interval. Step S23 therefore determines a single quantization parameter to use for the whole interval as described above. FIG. 4 illustrates the distribution of additional property values in the interval using a single quantization parameter.

However, if the pixel block has a more dense distribution close to the minimum reference property value as determined in step S22, the method continues to step S24. In this embodiment two different quantization parameters are used to thereby achieve different levels of quantization, i.e. step size, in the dense sub-interval and in the sparse sub-interval. Thus, a first quantization parameter $Q_1$ is determined in step S24 for the sub-interval close to the minimum reference property value, i.e. the dense sub-interval, while a second quantization parameter $Q_2$ is determined in step S25 for the remaining sub-interval, i.e. the sparse sub-interval.

Such a procedure can be implemented by calculating the quantization parameter Q as previously described herein. The first quantization parameter $Q_1$ could be defined as $Q_1 = Q+t$, while the second quantization parameter $Q_2$ is calculated as $Q_2 = Q-t$, where t is a positive number, such as one. This effectively decreases the step size $S_1 = 1 << (\text{bits}(RP_{max} - RP_{min}) - Q_1)$ for the dense sub-interval and increases the step size $S_2 = 1 << (\text{bits}(RP_{max} - RP_{min}) - Q_2)$ for the sparse sub-interval. The dense sub-interval is preferably defined as starting from the minimum reference property value up to the largest property values of those being assigned to be closer to the minimum reference property value than the maximum reference property value, i.e. the largest property value in the pixel block for which $\Delta_{ij}^{min} < \Delta_{ij}^{max}$ holds.

FIG. 7 illustrates this concept. Thus, by having a larger quantization parameter and smaller step parameter for the sub-interval closest to the minimum reference property value 10, a smaller quantization and thereby more additional reference property values 14 are provided in this sub-interval as compared to the remaining interval. Reference number 16 identifies the largest property value of this dense sub-interval.

If instead the property values are more closely located near the maximum reference property value as determined in step S21, the method continues to step S26. This step S26 determines the quantization parameter for the sparse sub-interval, i.e. close to the minimum reference property value, to have the smaller quantization parameter $Q_2$, while the dense sub-interval close to the maximum reference property value has the larger first quantization parameter $Q_1$ as determined in step S27.

FIG. 6 illustrates the resulting distribution of additional reference property values 14 in this embodiment. In this case, the dense sub-interval ranges from the maximum reference property value 12 to the smallest property value 16 determined to be closer to the maximum reference property value than the minimum reference property value.

The method continues from step S23, S25 or S27 to step S28, where one or more step parameters are calculated based on the determined quantization parameter or parameters. The method thereafter continues to step S11 of FIG. 3.

The order of steps S21 and S22 may be interchanged, i.e. first investigating whether we have a dense distribution close to the minimum reference property value and then investigating whether the property values are densely distributed close to the maximum property value.

Figure 5:
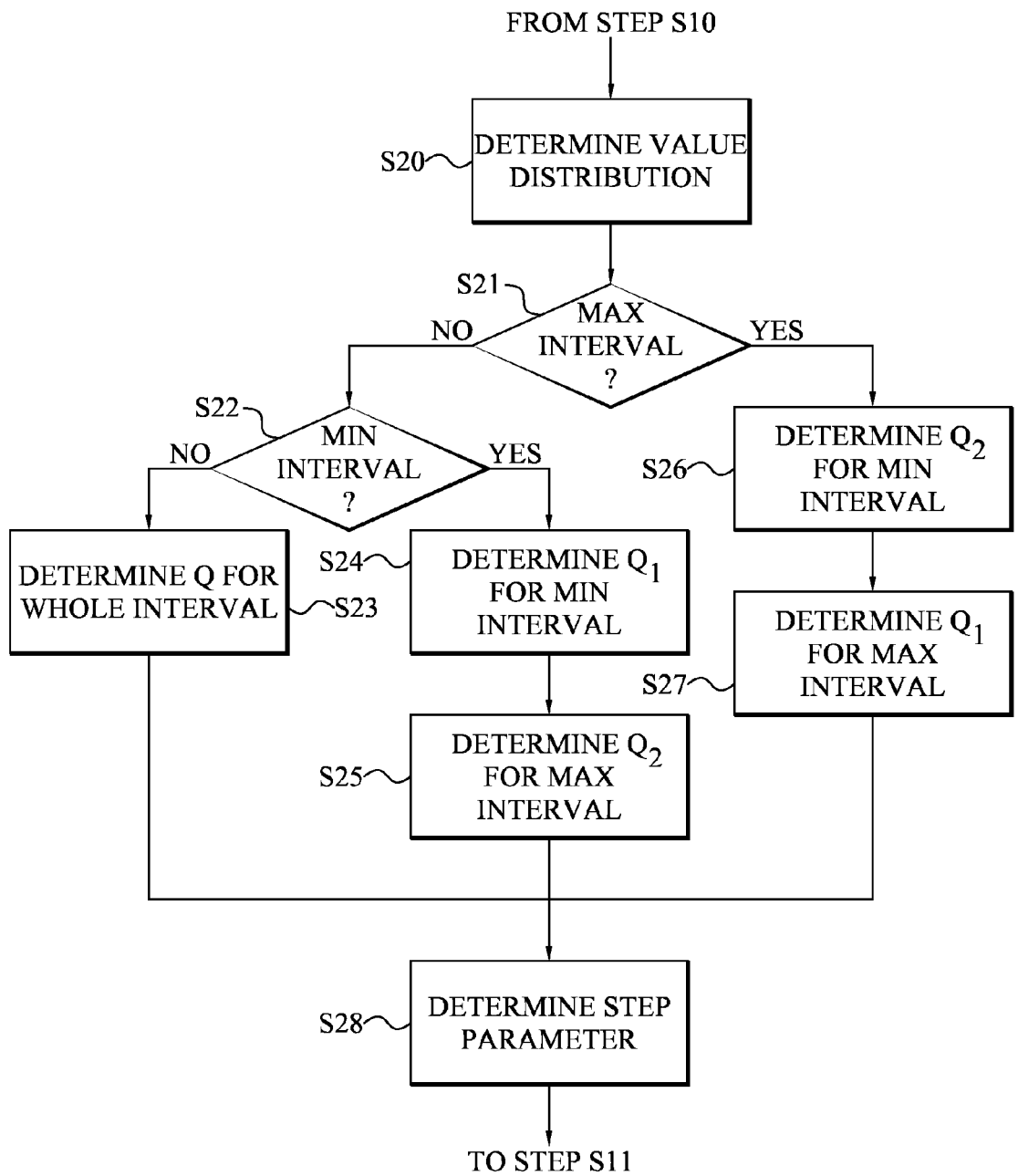
FIG. 5 is a flow diagram illustrating additional, optional steps of the set determining step.

Which of, in FIG. 5, the three different modes that is used for the pixel block, i.e. uniform, dense towards minimum reference property value or dense towards maximum reference property value, is preferably signaled in the compressed pixel block. In such a case, as 2-bit mode identifier can be used. For instance $00_{bin}$ indicates processing according to step S23, $01_{bin}$ indicates processing according to steps S24 and S25 and $10_{bin}$ indicates processing according to step S26 and S26. In the case of mode identifier $01_{bin}$, the compressed pixel block also comprises an encoded representation of the upper end of the dense sub-interval, i.e. the property value denoted by 16 in FIG. 7. Correspondingly, in the case of the mode $10_{bin}$, the compressed pixel block comprises an encoded representation of the lower end of the dense sub-interval, i.e. the property value indicated by 16 in FIG. 6.

This concept may of course be extended to provide further sub-intervals, such as provided around the middle of the interval from the minimum to the maximum reference property value. Such a sub-interval could then be defined as $$\left[ \frac{3 \times RP_{min} + RP_{max}}{4}, \frac{RP_{min} + 3 \times RP_{max}}{4} \right].$$

This sub-interval could occupy a fourth mode having mode identifier $11_{bin}$. In this case, no additional storage of reference property values are needed in the compressed pixel block as compared to modes $01_{bin}$ and $10_{bin}$. Alternatively, encoded representations of one or two reference property values could be included in the compressed pixel block. In the latter case, these two reference property values correspond to the smallest ($RP_{middle}^{min}$) of the "middle" reference property values and the largest ($RP_{middle}^{max}$) of the "middle" reference property values. In the former case, only the smallest or the largest of the "middle" reference property values is provided in the compressed pixel block. The other end of the dense subinterval is calculated as $RP_{max}+RP_{min}-RP_{middle}^{min}$ or $RP_{max}+RP_{min}-RP_{middle}^{max}$.

Figure 10:
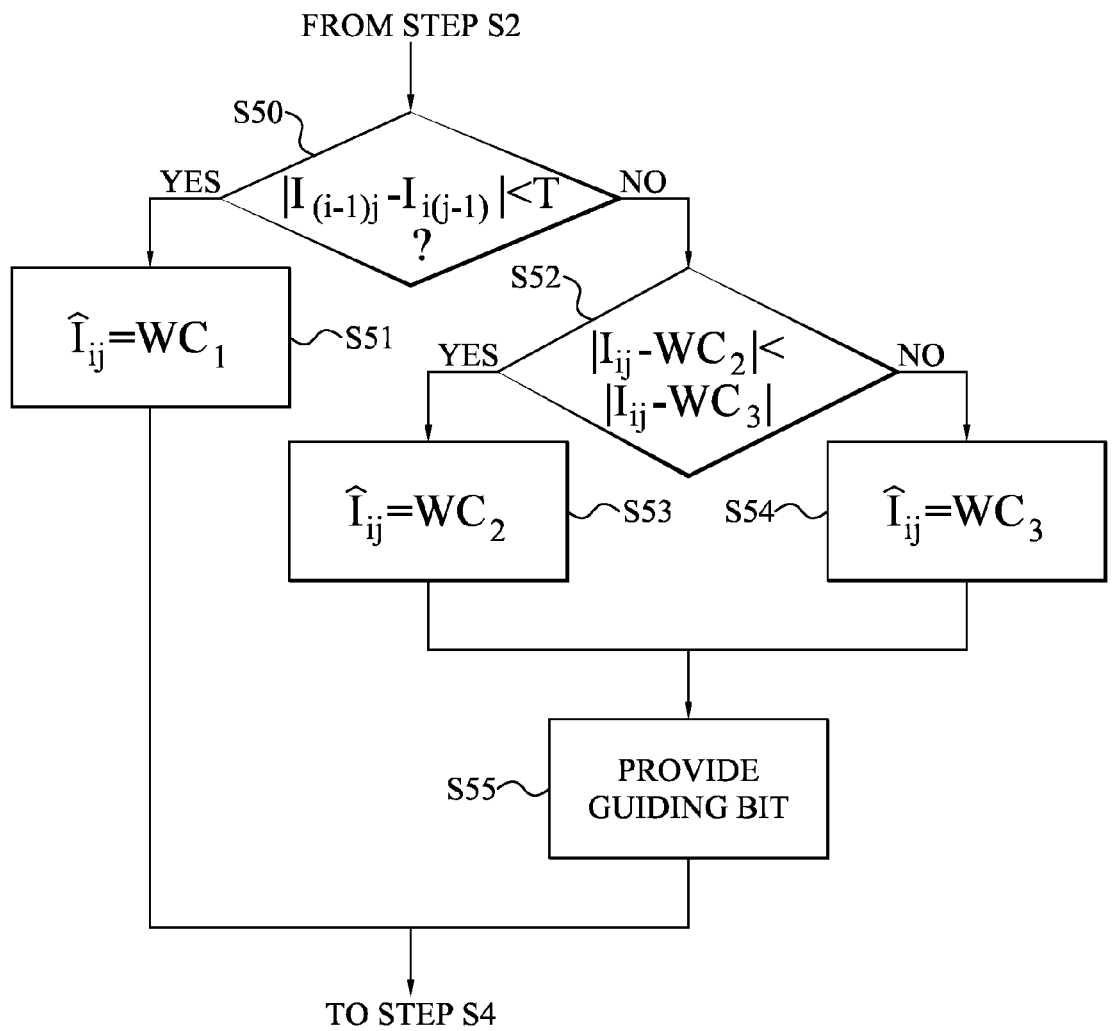
FIG. 10 is a flow diagram illustrating an embodiment of the prediction providing step in FIG. 1.

Herein a more detailed description of an embodiment of providing the prediction of the value index is presented with reference to FIGS. 9 and 10.

In a preferred embodiment as is illustrated in FIG. 9, a start value index is first determined in step S40 for the pixel block to be compressed. This start index value is preferably the index value assigned to a pixel at a defined position in the pixel block. With reference to FIG. 2 illustrating an example of a pixel block 300, this defined position is preferably the first pixel position 310 in the pixel block, i.e. occupying the upper left corner. Other examples of possible start pixel positions could be any of the other pixel block corners. Actually any predefined position in the pixel block could be used as start position although a corner position, and in particular the upper left corner pixel 310, significantly simplifies the compression of the pixel block.

The compressed pixel block comprises a representation of the selected start index value, $I_{ST}=I_{11}$.

Thereafter, predictions of remaining pixels 311, 312 belonging to the same row or column in the pixel block 300 as the start pixel 310 are determined in step S41. In a preferred implementation, this involves determining prediction based on the index value of the previous neighboring pixel in the row or column of the pixel block. For instance, a pixel 311 in the first row could have a prediction $\hat{I}_{ij}$ equal to $I_{1(j-1)}$, where $j=2, 3, K$ and $I_{11}$ is the start index value determined in step S40. The corresponding prediction for a pixel 312 in the first column is defined as $\hat{I}_{i1}=I_{(i-1)1}$, where $i=2, 3, K$. Alternatively, the prediction is determined based on the immediate preceding pixel in the first row/column and the next preceding pixel, such as $\hat{I}_{1j}=f(I_{1(j-1)}, I_{1(j-2)})$ and, for instance, $\hat{I}_{1j}=2I_{1(j-1)}-I_{1(j-2)}$, where $j=3, K$ The predictions for the value indices of the pixels 311, 312 in the first row and column have now been determined and the algorithm continues by providing prediction for remaining pixels 313, 314, 315, 316 in the pixel block 300. This procedure is illustrated in the flow diagram of FIG. 10. The prediction providing operation starts in step S50. This step S50 involves calculating a difference between the value index of a first neighboring pixel 315 in the pixel block 300 and the value index of a second neighboring pixel 314 in the pixel block 300. Thus, these two neighboring pixels 314, 315 are adjacent the current pixel 316 to compress in the pixel block 300. Furthermore, the pixels 314, 315 are relating to two different prediction directions relative the current pixel 316. In a preferred embodiment, the two neighboring pixels 314, 315 include a previous pixel 315 in a same row of the pixel block 300 and a previous pixel 314 in a same column of the pixel block 300.

The calculation of step S50 preferably involves calculating the difference $I_{(i-1)j}-I_{i(j-1)}$. Since it is the magnitude of the difference that is of relevance and not the sign, the absolute difference can be calculated in step S50 $|I_{(i-1)j}-I_{i(j-1)}|$. In an alternative approach, the squared difference is instead calculated in step S50 $(I_{(i-1)j}-I_{i(j-1)})^2$. Also other representations of magnitudes than these two are of course also possible.

In either case, the calculated difference representation is then compared to a defined threshold T. The comparison can therefore be realized as $|I_{(i-1)j}-I_{i(j-1)}| \lessgtr T$ or $(I_{(i-1)j}-I_{i(j-1)})^2 \lessgtr T^2$. If the difference between the value indices of the neighboring pixels 314, 315 is smaller than the threshold, the method continues from step S50 to step S51 otherwise it continues to step S52.

The value of the threshold T can be determined in an optimization procedure having as optimization goal to compress as many pixel blocks of different textures as possible and furthermore resulting in as short compressed pixel block lengths, in terms of number of bits, as possible.

Step S51 involves calculating the prediction of the current pixel 316 based on the value indices of the two neighboring pixels 314, 315. In other words, $\hat{I}_{ij}=f(I_{(i-1)j}, I_{i(j-1)})$, where $f()$ is a function, preferably defining a first weighted combination of the two neighboring value indices, $\hat{I}_{ij}=w_{(i-1)j}^1 I_{(i-1)j}+w_{i(j-1)}^1 I_{i(j-1)}$. The first weighted combination may also be rounded, floored or ceiled to get integer prediction values.

In a preferred embodiment, step S51 calculates the prediction based on an average of the value indices of the two neighboring pixels, $$\hat{I}_{ij} = g\left(\frac{I_{(i-1)j} + I_{i(j-1)}}{2}\right),$$

i.e. $w_{(i-1)j}^1=w_{i(j-1)}^1=0.5$. In a preferred implementation, the calculated average is employed as prediction, i.e. $\hat{I}_{ij}=0.5 \times I_{(i-1)j}+0.5 \times I_{i(j-1)}$. If only integer predictions are employed, the quotient can be rounded or input to a floor according to $\hat{I}_{ij}=\lfloor 0.5 \times I_{(i-1)j}+0.5 \times I_{i(j-1)} \rfloor$ or instead the ceiling counterpart. Other predictions determined based on the average are also possible such as $$\hat{I}_{ij} = 2 \times \frac{I_{(i-1)j} + I_{i(j-1)}}{2} - I_{(i-1)(j-1)}$$

also using the value index of a neighboring pixel 313 in a third prediction direction.

If the difference is instead not smaller than the threshold as investigated in step S50, the method continues to step S52. Step S52 comprises calculating a first difference between the value index of the current pixel 316 and a second weighted combination $WC_2$ of the value indices of the neighboring pixels 314, 315. Step S52 also involves calculating a second difference between the value index of the current pixel 316 and a third different weighted combination $WC_3$ of the value indices of the neighboring pixels 314, 315. The prediction for the pixel 316 is then selected to be based on, preferably equal to, one of the second and third weighted combination of the two neighboring value indices. Furthermore, this prediction selection is performed based on the two calculated differences. Generally, the weighted combination that is closest to the value index of the investigated pixel is selected. Thus, if $|I_{ij}-WC_2|<|I_{ij}-WC_3|$, or equivalently $(I_{ij}-WC_2)^2<(I_{ij}-WC_3)_2$ or indeed, though less preferred, $|I_{ij}-I_{(i-1)j}|<|I_{ij}-I_{i(j-1)}|$, the second weighted combination of the value indices is selected as the prediction in step S53, $\hat{I}_{ij}=WC_2$, otherwise the third weighted combination is selected as the prediction in step S54, $\hat{I}_{ij}=WC_3$.

The three weighted combinations of the two neighboring value indices are different weighted combinations, i.e. use different weights: $WC_1=w_{(i-1)j}^1 I_{(i-1)j}+w_{i(j-1)}^1 I_{i(j-1)}$, $WC_2=w_{(i-1)j}^2 I_{(i-1)j}+w_{i(j-1)}^2 I_{i(j-1)}$ and $WC_3=w_{(i-1)j}^3 I_{(i-1)j}+w_{i(j-1)}^3 I_{i(j-1)}$. As was discussed above, in connection with the first weighted combination, the second and third weighted combinations may be rounded, floored or ceiled to get integer values.

The weights $w_{(i-1)j}^1$, $w_{i(j-1)}^1$ of the first weighted combination or linear combination are non-zero weights and are preferably in the interval $0<w^1<1$. The weights for the second and third weighted combinations are preferably also non-zero but one per weighted combination may be zero. In such a case, $WC_2 = w_{(i-1)j}^2 I_{(i-1)j}$ with preferably $w_{(i-1)j}^2 = 1$ and $WC_3 = w_{i(j-1)}^3 I_{i(j-1)}$ with preferably $w_{i(j-1)}^3 = 1$. In a preferred embodiment $w_{i(j-1)}^2 = (1 - w_{(i-1)j}^2)$ and $w_{i(j-1)}^3 = (1 - w_{(i-1)j}^3)$, with $0 \leq w_{(i-1)j}^2, w_{(i-1)j}^3 \leq 1$. More preferably, $w_{(i-1)j}^3 = (1 - w_{i(j-1)}^2)$. In such a case, the second weighted combination is $WC_2 = w_{(i-1)j}^2 I_{(i-1)j} + (1 - w_{(i-1)j}^2) I_{i(j-1)}$ and the third weighted combination is $WC_3 = (1 - w_{(i-1)j}^2) I_{(i-1)j} + w_{(i-1)j}^2 I_{i(j-1)}$. An example of suitable weight values for the second and third combinations could be $WC_2 = 0.75 I_{(i-1)j} + 0.25 I_{i(j-1)}$ and $WC_3 = 0.25 I_{(i-1)j} + 0.75 I_{i(j-1)}$. In the case $w_{(i-1)j}^2 = 1$ and $w_{i(j-1)}^2 = 0$, $WC_2 = I_{(i-1)j}$ and $WC_3 = I_{i(j-1)}$. This corresponds to selecting one of the value indices of the two neighboring pixels 314, 315 as prediction of the value index of the current pixel 316.

The method continues to step S55, where a guiding bit associated with the selected prediction is provided. Thus, if the second weighted combination was selected as prediction in step S53, the guiding bit could be set to $0_{bin}$. However, if instead the third weighted combination is selected in step S54, the guiding bit could be $1_{bin}$. Alternatively, the guiding bit is set to $1_{bin}$ if the second weighted combination was selected in step S53 and $0_{bin}$ if the third weighted combination was selected in step S54.

The method then continues to step S4 of FIG. 1, where the prediction error is calculated based on the value index of the current pixel 315 and the prediction provided in step S51, S53 or S53.

The above-described prediction algorithm used for providing the predictions of the value indices will effectively handle discontinuities in the pixel block, through the selection of prediction directions performed in step S50 and the assignment of the guiding bit in step S55.

However, other prediction algorithms can instead be used in connection with the embodiments. For instance, the so-called Weinberger of LOCO-I predictor [4] may be used. With reference to FIG. 2, the prediction $\hat{I}_{ij}$ of the value index of a current pixel 314 is defined as:

$$\hat{I}_{ij} = \begin{cases} \min(I_{i(j-1)}, I_{(i+1)j}) & I_{(i+1)(j-1)} \geq \max(I_{i(j-1)}, I_{(i+1)j}) \\ \max(I_{i(j-1)}, I_{(i+1)j}) & I_{(i+1)(j-1)} \leq \min(I_{i(j-1)}, I_{(i+1)j}) \\ I_{i(j-1)} + I_{(i+1)j} - I_{(i+1)(j-1)} & \text{otherwise} \end{cases}$$

Thus, different prior art prediction algorithms can be used in step S3 of FIG. 1 for providing the prediction. However, once a prediction algorithm has been selected, it should be used at both the compression and the decompression of the pixel blocks.

In order to achieve similar prediction operations at both the compression and the decompression side, the neighboring value indices that are used for calculating the predictions have preferably previously been compressed as described herein and then decompressed to retrieve back decoded representations of the value indices.

The generation of encoded representation of the prediction error in step S5 is preferably performed as discussed below. The prediction errors are preferably first modified to get positive predictive errors. This modification preferably involves applying the function $n(x) = -2x$ to negative prediction errors including zero errors and the function $p(x) = 2x - 1$ to positive ones excluding zero errors, where x here denotes the input prediction error. This will result in a new arrangement of prediction errors as $\{0, 1, -1, 2, -2, 3, -3, K\}$, which means that numbers of small magnitudes will have small value. Each modified prediction error is then preferably Golomb-Rice encoded [5-6] to obtain the encoded representation.

The Golomb-Rice encoding involves searching for an exponent number k. This number k is preferably employed for a set of at least one pixel in the pixel block. For instance, four pixels in a 2×2 group in the pixel block can share the same k. An exhaustive search among available values of k, such as between 0 and 15 can be used to find the best k for the group. However, the search can be computationally reduced by only looking at a selected portion of the available k values. This preferred k searching comprises searching for a k in an interval of [p−4,p], where p is the bit position of the most significant bit of the largest prediction error of the pixel group.

Thereafter, each prediction error of the group is divided by $2^k$ to form a respective quotient and a remainder. The quotients are unary encoded, preferably performed according to Table 1 below.

TABLE 1

| unary codes | |
|---|---|
| Unary code | Quotient |
| $0_{bin}$ | 0 |
| $10_{bin}$ | 1 |
| $110_{bin}$ | 2 |
| $1110_{bin}$ | 3 |
| $11110_{bin}$ | 4 |
| ... | ... |

Unary encoding assigns longer codes to larger values as is evident from Table 1. Generally values larger than 31 are encoded using $0xffff_{hex}$, followed by the 16 bits of the value.

The encoded representation of the prediction error comprises the unary code and the k bits of the remainder. In addition, the value k is stored for the group of pixels. This procedure is performed for each pixel in the pixel block with the exception of the start pixel. The assigned value index for this pixel is stored as start index values.

Even though Golomb-Rice coding is a possible coding algorithm that can be used, the present invention is not limited thereto. Instead other coding algorithms, in particular entropy encoding algorithms, such as Huffman coding [7] or Tunstall coding [8], can alternatively be employed.

FIG. 11 is a schematic illustration of a compressed pixel block 400 according to an embodiment. The compressed pixel block 410 comprises an encoded representation 410 of the reference set, such as in the form of the minimum 412 and maximum 414 reference property values. If a non-uniform distribution of the additional reference property values are to be allowed, the encoded representation 410 preferably also comprises the above-mentioned mode identifier and the additional reference property value that constitutes, together with one of the minimum and maximum reference property values, the end points of the more densely distributed sub-interval.

The compressed pixel block 400 also comprises a sequence 420 of the encoded representations of the prediction errors 424 generated for at least a portion of the pixels in the pixel block. As was discussed above, such an encoded representation 424 may contain the unary code and the remainder of the entropy encoded residual errors together with the value k. The sequence 420 also comprises the start index value 422, preferably in uncoded and unquantized form.

In the case each pixel of the pixel block has multiple different property value types, the final compressed pixel block 400 preferably comprises one encoded representation 410 of a reference set and one sequence 420 of encoded representations 424 of prediction errors per property value type.

Decompression

FIG. 12 is an illustration of a flow diagram showing a method of decompressing or decoding a compressed or coded pixel block according to an embodiment. The method starts in step S60, where a reference set of multiple reference property values is provided. The reference set is furthermore preferably, unless it is being fixed, provided in step S60 based on an encoded representation of the reference set comprised in the compressed pixel block. As has been discussed in the foregoing, this encoded representation can be a set identifier allowing identification of one reference set among multiple pre-defined reference sets. Alternatively and more preferred, the encoded representation comprises data allowing calculation of the multiple reference property values in the reference set, such as the minimum and maximum reference property values or one of the minimum and maximum reference property values and an offset representation.

A next step S61 determines a prediction error for at least one pixel in the pixel block to be decompressed. This prediction error is determined based on an encoded representation of the prediction error associated with the pixel and comprised in the compressed pixel block. The prediction error is preferably determined by entropy decoding the encoded representation to get the prediction error as is further described herein.

A prediction of a value index for the pixel is provided in step S62 based on the value index assigned to at least one neighboring pixel in the pixel block. This at least one neighboring pixel has furthermore already been decompressed to thereby get a decoded representation of its value index or their value indices.

The prediction provided in step S62 and the prediction error determined in step S62 are used for calculating the value index of the pixel. In a typical embodiment, the value index is calculated as the sum of the prediction and the prediction error; $I_{ij} = \hat{I}_{ij} + \tilde{I}_{ij}$.

The calculated value index is used in step S64 for providing a reference property value from the reference set provided in step S60. Thus, the value index allows identification of one of the multiple reference property values in the reference set. The identified and provided reference property value is assigned to the pixel as decoded representation of its original property value.

The decoded representation may be further processed, such as transformed from luminance and chrominance values into R, G, B color values.

The loop formed by step S61 to S64 is preferably performed for multiple pixels in the compressed pixel block to be decompressed, which is schematically illustrated by the line L4. In such a case, the loop is preferably performed in a pre-defined decompression order, such as from left to right and from top to bottom of the pixel block.

The method then ends or returns to step S60 for the purpose of decompressing another pixel block, schematically illustrated by the line L5. The method disclosed in FIG. 12 is preferably performed sequentially or in parallel for each property value type of the pixels in the pixel block.

FIG. 13 is a flow diagram illustrating an embodiment of the reference set providing step of FIG. 12. The method starts in step S70, which provides a minimum reference property value and a maximum reference property value based on respective encoded representations comprised in the compressed pixel block. At least one additional reference property value is defined based on the minimum and maximum reference property values in step S71. This at least one additional reference property value is preferably calculated as a linear combination of the minimum and maximum reference property values as discussed above in connection with step S11 of FIG. 3. The at least one defined additional reference property value constitutes, together with the minimum and maximum reference property values, the reference set for the current pixel block. The method continues to step S61 of FIG. 12.

The definition of the at least one additional reference property value is preferably performed by determining a quantization parameter based on the minimum and maximum reference property values as previously disclosed. A step parameter is determined based on the quantization parameter and is used together with one of the minimum and maximum reference property values for defining the at least one additional reference property values.

Figure 14:
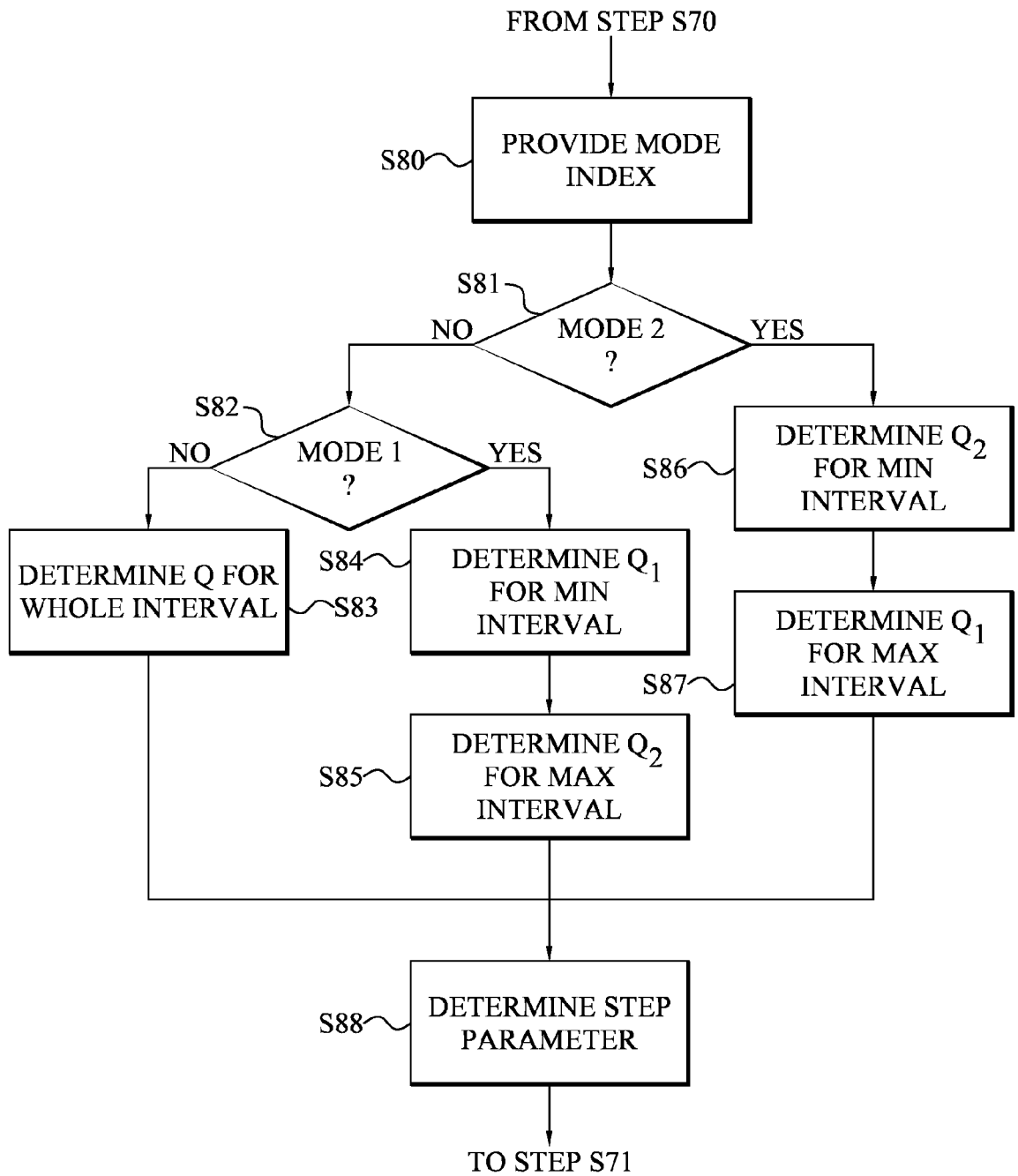
FIG. 14 is a flow diagram illustrating additional, optional steps of the set providing step.

Different sub-intervals in the interval from the minimum to the maximum reference property value can have different dense distributions of additional reference property values. FIG. 14 illustrates additional steps handling such a situation. The method continues from step S70 of FIG. 13. A next step S80 provides a mode index from the compressed pixel block. This mode index signals that the pixel block has been compressed according to one of multiple, such as three different, modes. Step S81 investigates whether the mode index indicates a mode 2, $10_{bin}$. If not, the method continues to step S82 that checks whether the mode index represents a mode 1, $01_{bin}$. If not, a mode 0, $00_{bin}$, has been used and a single uniform distribution of the additional reference property values in the interval should be used. Step S83 therefore determines a single quantization parameter applicable to the whole interval.

If, however, the mode index indicates mode 1, the method continues from step S82 to step S84. In this case a dense distribution is to be applied to the lower sub-interval, while the remaining portion of the interval has a sparser distribution of additional reference property values as is illustrated in FIG. 7. A first quantization parameter $Q_1$ is determined for the dense sub-interval in step S84 and a second quantization parameter $Q_2$ is determined for the remaining sparser sub-interval in step S85. In a particular embodiment $Q_1 = Q+t$ and $Q_2 = Q-t$, where Q is the quantization parameter corresponding to the case where a single, uniform distribution would have been used for the pixel block and t is a positive number, such as one.

The denser sub-interval is identified as running from the minimum reference property value 10, see FIG. 7, up to a largest additional reference property value 16 of the minimum additional reference property values. This largest additional reference property value 16 is indicated in the compressed pixel block.

If instead mode 2 is to be used, the method continues from step S81 to step S86. Step S86 determines the second quantization parameter for the remaining sub-interval, while step S87 determines the first quantization parameter for the denser, sub-interval being positioned in this mode close to the maximum reference property value, see FIG. 6. Thus, this situation is basically the opposite to FIG. 7. The smallest of the maximum additional reference property values 16 is included in the compressed pixel block and allows identification of the dense sub-interval and the remaining sub-interval.

The one or two quantization parameters determined in steps S83 to S87 are used in step S88 for determining one or two step parameters for the pixel block. The determination of the step parameter based on an input quantization parameter is preferably performed as previously described. The method then continues to step S71 of FIG. 13.

FIG. 15 is a flow diagram illustrating additional steps of the decompression method of FIG. 12. The method continues from step S61 of FIG. 12. The value index of the start pixel in the pixel block is provided in step S90 based on a representation of the start value index included in the compressed block representation. In a preferred embodiment, the start value index is provided in uncoded form in the compressed pixel block and can therefore be assigned directly as value index of the start pixel. This pixel has a predefined position in the pixel block as previously discussed, preferably at (i,j)=(1, 1), i.e. upper left corner.

Thereafter, a prediction for a next pixel in the same pixel row or column as the start pixel is provided in step S91. In this embodiment, the value index of the start pixel, i.e. the start value index, is used as prediction for the neighboring pixel. The value index of the pixel is then determined based on this prediction and a prediction error determined for the pixel based on information included in the compressed pixel block. This procedure is repeated for the remaining pixels in the pixel row or column comprising the start pixel. However, for these other pixels, the prediction is not necessarily the value index of the start pixel but in clear contrast equal to the value index calculated for the most previous neighboring pixel in the same row or column as the current pixel. The method then continues to step S62 of FIG. 12 where the predictions are provided for the remaining pixels in the pixel block.

In step S61 a prediction error is determined for a pixel of the pixel block to be decoded. This prediction error is determined based on an encoded error representation associated with the pixel and included in the compressed pixel block. Step S61 therefore involves utilizing the encoded error representation for calculating the pixel prediction error.

The prediction error is preferably performed by Golomb-Rice, or Hoffman or Tunstall, for instance, decoding the encoded representation of the prediction error. In such a case, the prediction error preferably comprises a unary coded quotient, a remainder and an exponent value k. The quotient can be obtained from the unary coded data using Table 1 above. Thereafter, the quotient and remainder forms a value that is multiplied by $2^k$ to form the prediction error.

Figure 16:
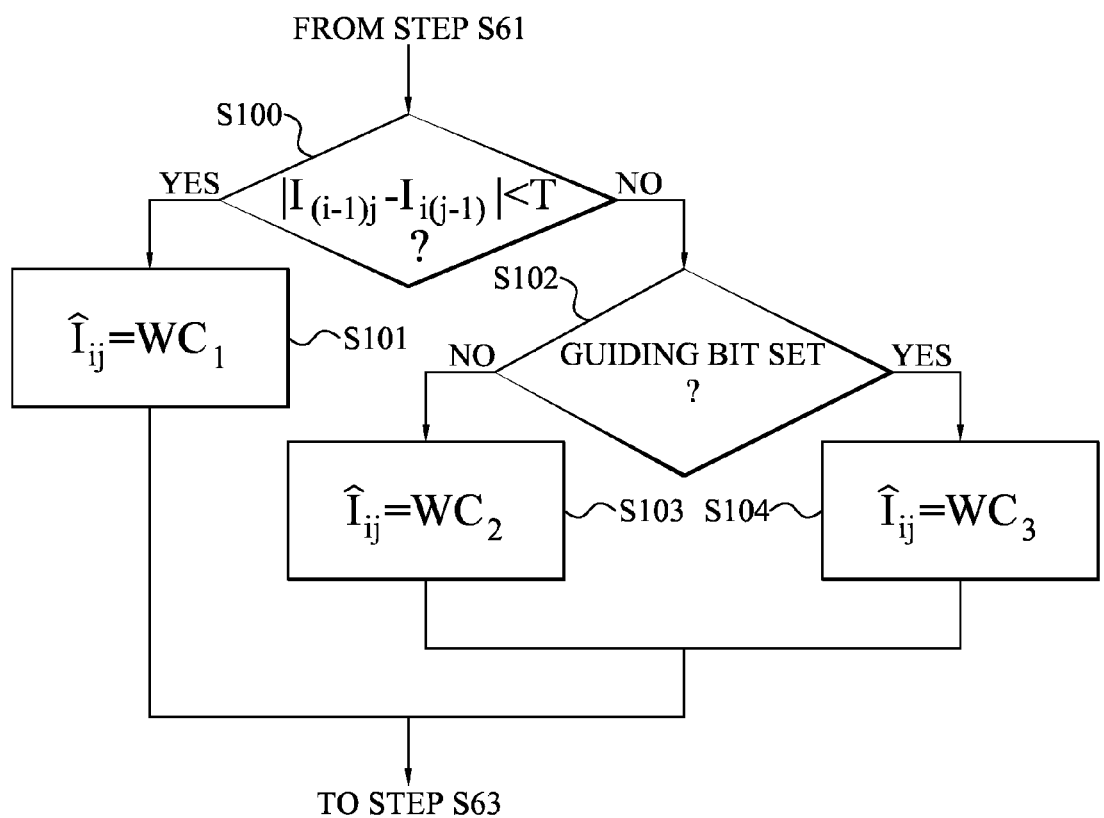
FIG. 16 is a flow diagram illustrating an embodiment of the prediction providing step in FIG. 12.

Prediction of the value indices of the pixels not present in the first row or column are determined, preferably according to the embodiment illustrated in FIG. 16. The prediction provision involves calculating a difference between the value indices of two neighboring pixels in the pixel block. These two pixels are adjacent pixels of different prediction directions in the pixel block and preferably are positioned at a previous pixel position in the same row or column in the pixel block as the current pixel to be decoded. The difference is preferably the absolute difference or the squared difference to only provide a magnitude representation of the difference irrespective of the sign. The difference is compared with a predefined threshold in step S100. If the difference is smaller than the threshold, the prediction is performed according to step S101 otherwise the method continues to step S102.

Step S101 calculates the prediction from the value indices of the two neighboring pixels in the pixel block and which were employed for calculating the difference used in the comparison of step S100. The prediction is preferably calculated based on a first weighted combination with non-zero weights, preferably an average of the two value indices as discussed in connection with step S51 of FIG. 10.

If the difference is not smaller than the threshold as determined in step S100, step S102 investigates the value of a guiding bit associated with the coded pixel and included in the compressed pixel block. If the guiding bit has a first bit value, such as $0_{bin}$, the method continues to step S103. However, if the guiding bit instead has a second bit value, such as $1_{bin}$, the prediction provision is conducted according to step S104. Step S103 involves calculating the prediction to be based on, preferably equal to, a second weighted combination of the value indices of the two neighboring pixels in the block. Step S104 correspondingly involves calculating a third weighted combination of the value indices of the neighboring pixels in the pixel block as prediction for the pixel. This means that in this case, the guiding bit included in the compressed pixel block for the current pixel dictates which of the two possible candidate predictions that is to be used for the pixel. The operation of these steps S103 and S104 is similar to the steps S53 and S54 of FIG. 10.

The method then continues to step S63 of FIG. 12, where the value index is calculated for the pixel based on the prediction error determined in step S61 and the prediction provided in step S101, S103 or S104.

Compressor

FIG. 17 is a schematic block diagram of a block compressor 100 according to an embodiment. The block compressor 100 comprises a set determiner 110 for determining a reference set of multiple reference property values for a pixel block to be compressed. An index assigner 120 is implemented for assigning respective value indices to each pixel in the pixel block. These value indices are associated with reference property values in the reference set determined by the set determiner 110.

A prediction provider 130 provides a prediction of the value index assigned to a pixel based on the value index assigned to at least one neighboring pixel in the pixel block as previously discussed. The provided prediction is used by an error calculator 140 for calculating a prediction error, typically defined as the difference between the value index assigned to the pixel by the index assigner 120 and the prediction provided for the pixel by the prediction provider 130.

The calculated prediction error is input to a representation generator 150. The representation generator 150 processes the prediction error and determines an encoded representation thereof. The compressed pixel block determined by the block compressor 100 comprises these encoded representations of the prediction errors together with an encoded representation of the determined reference set.

The units 110 to 150 of the block compressor 100 may be provided as software, hardware or a combination thereof. The units 110 to 150 may be implemented together in the block compressor 100. Alternatively, a distributed implementation is also possible. In the case of a software implementation, the block compressor 100 is preferably implemented in a CPU of a computer, mobile telephone, laptop, game console or some other terminal or unit having the need for compressing images, textures and/or buffers.

FIG. 18 is a schematic block diagram of an embodiment of the set determiner 110 in FIG. 17. The set determiner 110 comprises a reference value determiner 111 for determining a minimum reference property value and a maximum reference property value based on at least a portion of the property values of the pixel block to be compressed. The reference value determiner 111 preferably identifies the smallest and largest property values of the pixel block and uses them as the minimum and maximum reference property values.

A reference value definer 113 is provided in the set determiner 113 for defining at least one additional reference property value based on the minimum and maximum reference property values from the reference value determiner 111. Multiple additional reference property values are preferably calculated by the definer 113 as different linear combinations of the minimum and maximum reference property values. This one, preferably multiple, additional reference property values constitute together with the minimum and maximum reference property values the reference set. The compressed pixel block preferably comprises respective encoded representation of the minimum and maximum reference property values.

A quantization determiner 115 is preferably implemented in the set determiner 110 for determining at least one quantization parameter based on the minimum and maximum reference property values. The at least one quantization parameter is input to step determiner 117 that generates at least one step parameter based on the at least one quantization parameter. The at least one step parameter is preferably used by the reference value definer 113 together with one of the minimum and maximum reference property values for defining the at least one additional reference property value.

The set determiner 110 optionally comprises a distribution determiner 119 for determining a distribution of the property values in the pixel block in the interval from the minimum reference property value to the maximum reference property value. The quantization determiner 115 determines one or multiple quantization parameter for the pixel block based on the determined distribution. A single quantization parameter is determined if the distribution is fairly uniform throughout the whole interval. However, if a sub-interval of the interval presents a comparatively denser distribution of property values, such as at least 75% of the property values, a first quantization parameter is determined for the dense sub-interval, while a second quantization parameter is determined the remaining, sparser sub-interval.

The units 111 to 119 of the set determiner 110 may be provided as software, hardware or a combination thereof. The units 111 to 119 may be implemented together in the set determiner 110. Alternatively, a distributed implementation is also possible with some of the units provided elsewhere in the block compressor.

FIG. 19 is a schematic block diagram illustrating an embodiment of the index assigner 120 in FIG. 17. The index assigner 120 comprises a difference calculator 121 arranged for calculating a value difference between the property value of a pixel and one of a minimum reference property value and a maximum reference property value of the reference set.

An index determiner 123 determines the value index of the pixel based on the value difference from the difference calculator 121 and a step parameter provided from the set determiner of the block compressor.

The units 121 and 123 of the index assigner 120 may be provided as software, hardware or a combination thereof. The units 121 and 123 may be implemented together in the index assigner 120. Alternatively, a distributed implementation is also possible with some of the units provided elsewhere in the block compressor.

FIG. 20 is a schematic block diagram illustrating an embodiment of the prediction provider 130 in FIG. 17. The prediction provider is 130 preferably arranged for selecting a start index value for the pixel block to be compressed. In an embodiment, this start index value is the value index assigned to a selected pixel in the pixel block. This pixel preferably has a predefined pixel position in the pixel block and is preferably the upper left pixel. The compressed pixel block representation comprises a representation of the start index value.

The prediction calculator 131 is arranged for providing predictions for pixels present in the same row and column as the start pixel, preferably the first row and column. For these pixels, the respective predictions are selected to be based on the value index of the pixel having the immediate preceding position towards the start pixel in the same row or column as the current pixel.

The prediction calculator 131 is also implemented for calculating a difference between the value index of two neighboring pixels positioned adjacent to the current pixel but at previous positions in the same pixel column or pixel row in the pixel block. The particular predictions to select for the remaining pixels are then determined at least partly based on this difference.

If the absolute value of the difference or the squared difference is smaller than a predefined threshold value as determined by prediction calculator 131, the prediction calculator 131 calculates the prediction of the pixel based on a first weighted combination of the value indices of the two neighboring pixels. The prediction calculator 131 preferably determines an average of these two neighboring value indices. The prediction is then calculated from the average, possibly utilizing further value indices of pixels in the pixel block, but is preferably equal to the average.

However, if the difference is not smaller than the threshold, a prediction selector 133 of the prediction provider 130 is activated. This prediction selector 133 selects one of a second weighted combination and a third different weighted combination of the value indices of the two neighboring pixels as prediction for the pixel. The prediction selector 133 is preferably also configured for calculating the respective second and third weighted combinations of the value indices.

In a preferred embodiment, a difference calculator 137 calculates, if the difference $|I_{(i-1)j}-I_{i(j-1)}|$ is not smaller than the threshold as determined by the prediction calculator 131, a first difference between the second weighted combination of the value indices of the two neighboring pixels and the current pixel and a second difference between the third weighted combination of the value indices of the neighboring pixels and the current pixel. The prediction selector 133 uses these two calculated differences for selecting the prediction of the value index of the current pixel. Generally, the prediction selector 133 selects the one of the second and third weighted combination that results in the smallest difference, in terms of magnitude, of the first and second differences.

A bit provider 135 is arranged functionally connected to the prediction selector 133. The bit provider 135 generates a guiding bit representative of the selected prediction direction and the weighted combination selected by the prediction selector 133 as prediction of the current value index.

The units 131 to 137 of the prediction provider 130 may be provided as software, hardware or a combination thereof. The units 131 to 137 may be implemented together in the prediction provider 130. Alternatively, a distributed implementation is also possible with some of the units provided elsewhere in the block compressor.

Decompressor

FIG. 21 is a block diagram of an embodiment of a block decompressor 200 for decompressing a compressed pixel block. The block decompressor 200 comprises a set provider 210 for providing a reference set comprising multiple reference property values. The set provider 210 uses an encoded representation of the reference set comprises in the compressed pixel block to form the reference set.

An error determiner 220 is arranged for determining a prediction error for a pixel to be decompressed. This prediction error is determined based on an encoded representation of the prediction error associated with the pixel and comprised in the compressed pixel block.

The block decompressor 200 also comprises a prediction provider 230 for providing a prediction of the value index of the pixel based on the value index previously decompressed for at least one neighboring pixel in the pixel block.

An index calculator 240 uses the prediction error from the error determiner 220 and the prediction from the prediction provider 230 in order to calculate a value index for the pixel. This calculated value pixel is used by a value provider 250 for providing a reference property value from the reference set as decoded representation of the original property value of the pixel.

The units 210 to 250 of the block decompressor 200 may be provided as software, hardware or a combination thereof. The units 210 to 250 may be implemented together in the block decompressor 200. Alternatively, a distributed implementation is also possible. In the case of a hardware implementation, the block decompressor 200 is preferably implemented in a GPU of a computer, mobile telephone, laptop, game console or some other terminal or unit having the need for decompressing images, textures and/or buffers.

Figure 22:
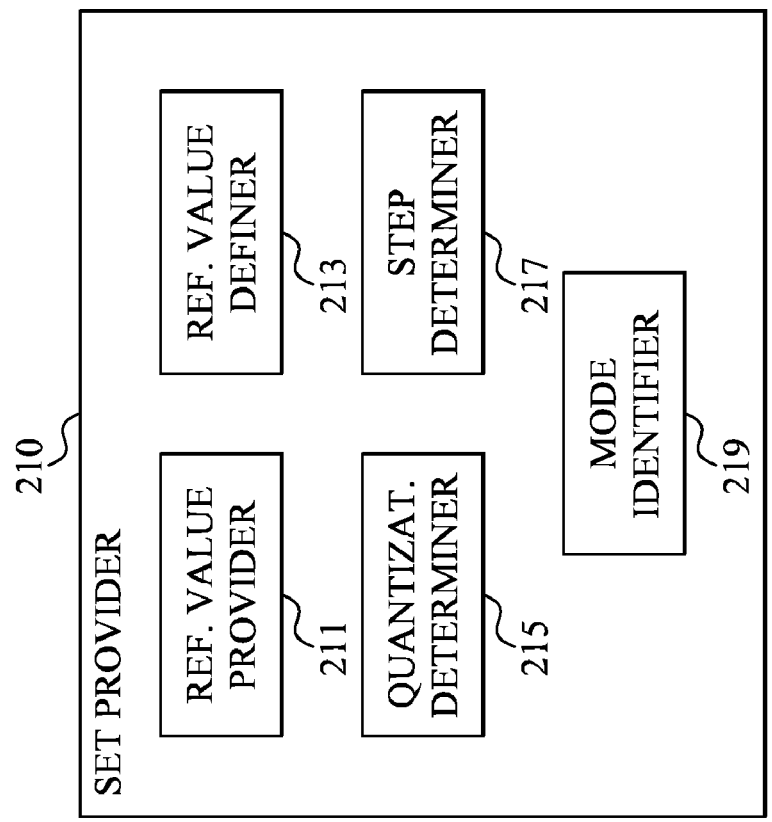
FIG. 22 is a schematic block diagram of an embodiment of the set provider in FIG. 21.

FIG. 22 is a schematic block diagram of an embodiment of the set provider 210 in FIG. 21. The set provider 210 comprises a reference value provider 211 for providing a minimum and a maximum reference property value based on the encoded representation of the reference set comprised in the compressed pixel block. A reference value definer 213 defines at least one, preferably multiple, additional reference property values of the reference set based on the minimum and maximum reference property values from the reference value provider 211.

A quantization determiner 215 of the set provider 210 determines one or multiple quantization parameters for the pixel block based on the minimum and maximum reference property values, such as $$Q = \max\left(1, \frac{\text{bits}(RP_{max} - RP_{min}) + 1}{2}\right).$$

The set provider 210 optionally also comprises a mode identifier 219 that investigates which of multiple available decompression modes that should be used, depending on the distribution of the original property values of the pixel block. The mode identifier 219 investigates a mode index preferably included in the compressed pixel block. If the mode index indicates a mode 0, the quantization determiner 215 typically only determines a single quantization parameter that is to be used for achieving a uniform distribution of additional reference property values in the interval. However, if the mode index indicates any other mode, the quantization determiner 215 preferably determines at least two different quantization parameters, of which one is applied to a denser sub-interval and the other is applied to a sparser, remaining sub-interval.

The one or more quantization parameters from the quantization determiner 215 is input to a step determiner 217. The step determiner 217 determines one or more step parameters that are used by the reference value definer 213 together with one of the minimum and maximum reference property values to define at least one additional reference property value. The reference value definer 213 preferably also retrieves information included in the compressed pixel block and defining the respective dense and sparse sub-interval portions.

The units 211 to 219 of the set provider 210 may be provided as software, hardware or a combination thereof. The units 211 to 219 may be implemented together in the set provider 210. Alternatively, a distributed implementation is also possible with some of the units provided elsewhere in the block decompressor.

Figure 23:
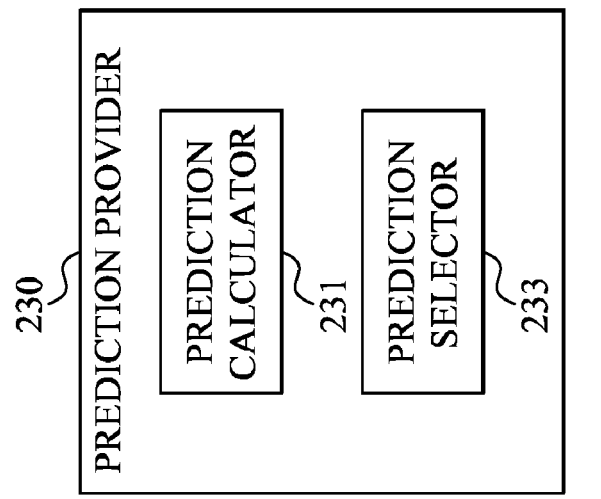
FIG. 23 is a schematic block diagram of an embodiment of the prediction provider in FIG. 21.

FIG. 23 is a schematic block diagram of an embodiment of the prediction provider 230 in FIG. 21. The prediction provider 230 is implemented for providing a start index value of a start pixel in the pixel block. The value index of the start pixel is preferably set equal to the start index value comprised in the compressed pixel block.

The prediction provider 230 also provides predictions for pixels in the same row and column as the start pixel by setting the prediction to be equal to the value index of the previous pixel in the row or column.

The prediction provider 230 calculates a difference between the previously decoded value indices of two neighboring pixels present in the same pixel block row and column as the current pixel. This difference or more preferably the absolute value or squared difference is compared to a predefined threshold. If the difference is smaller than the threshold, a prediction calculator 231 is activated and calculates the prediction based on a first non-zero weighted combination of these two neighboring value indices. As has been discussed above, the calculation is preferably performed based on an average of the two value indices.

However, if the difference exceeds the threshold, a prediction selector 233 selects one of the second and third weighted combinations of the previously decoded value indices of the neighboring pixels as prediction. This selection is furthermore performed based on the guiding bit assigned to the pixel and included in the compressed pixel block.

The units 231 and 233 of the prediction provider 230 may be provided as software, hardware or a combination thereof. The units 231 and 233 may be implemented together in the prediction provider 230. Alternatively, a distributed implementation is also possible with some of the units provided elsewhere in the block decompressor.

It will be understood by a person skilled in the art that various modifications and changes may be made to the present invention without departure from the scope thereof, which is defined by the appended claims.

The invention claimed is:

1. A method of compressing a pixel block comprising multiple pixels, each pixel having a property value, said method comprising:
   determining a minimum reference property value and a maximum reference property value based on at least a portion of said property values of said multiple pixels;
   determining a distribution of said property values of said multiple pixels in an interval from said minimum reference property value to said maximum reference property value;
   determining a mode index based on said distribution of said property values in said interval;
   determining at least one quantization parameter based on said minimum reference property value and said maximum reference property value, by:
      if said mode index indicates that at least a minimum portion of said property values of said multiple pixels is within a predefined sub-interval:
         determining, based on said minimum reference property value and said maximum reference property value, a first quantization parameter applicable in said predefined sub-interval; and
         determining, based on said minimum reference property value and said maximum reference property value, a second, different quantization parameter applicable in a remaining portion of said interval, and
      if said mode index indicates that said at least a minimum portion of said property values of said multiple pixels is not within said predefined sub-interval, determining one quantization parameter based on said minimum reference property value and said maximum reference property value, determining at least one step parameter based on said at least one quantization parameter;

defining at least one additional reference property value based on said at least one step parameter and at least one of said minimum reference property value and said maximum reference property value, to thereby determine a reference set that comprises said minimum reference property value, said maximum reference property value and said at least one additional reference property value;

assigning, for each pixel of said multiple pixels and based on a property value of said pixel, a value index associated with a reference property value of said reference set;

providing, for at least one pixel of said multiple pixels, a prediction of said value index assigned to said at least one pixel based on said value index assigned to at least one neighboring pixel in said pixel block;

calculating a prediction error based on said value index assigned to said at least one pixel and said prediction of said value index; and generating an encoded representation of said prediction error, to determine a compressed pixel block that comprises said encoded representation of said prediction error, an encoded representation of said minimum reference property value, an encoded representation of said maximum reference property value, and said mode index.

2. The method according to claim 1, wherein assigning, for each pixel of said multiple pixels and based on a property value of said pixel, a value index comprises:

calculating a value difference between said property value of said pixel and one of said minimum reference property value and said maximum reference property value; and determining said value index based on said value difference and said step parameter.

3. The method according to claim 1, wherein providing, for at least one pixel of said multiple pixels, a prediction of said value index assigned to said at least one pixel comprises:

calculating said prediction based on a first weighted combination of a value index assigned to a first neighboring pixel in said pixel block and a value index assigned to a second neighboring pixel in said pixel block, employing non-zero weights if a magnitude difference between said value indices of said neighboring pixels is smaller than a threshold;

selecting said prediction to be based on one of a second different, weighted combination of said value indices of said neighboring pixels and a third different, weighted combination of said value indices of said neighboring pixels if said magnitude difference is not smaller than said threshold; and providing a guiding bit associated with said selected one of said second weighted combination and said third weighted combination if said magnitude difference is not smaller than said threshold.

4. The method according to claim 3, wherein said selecting comprises:

calculating a first difference between said second weighted combination and said value index assigned to said at least one pixel;

calculating a second difference between said third weighted combination and said value index assigned to said at least one pixel; and selecting said prediction based on said first difference and said second difference.

5. A method of decompressing a compressed pixel block constituting an encoded representation of a pixel block, the pixel block comprising multiple pixels, said method comprising:

providing a minimum reference property value and a maximum reference property value based on an encoded representation of said minimum reference property value and an encoded representation of said maximum reference property value comprised in said compressed pixel block;

determining at least one quantization parameter based on said minimum reference property value and said maximum reference property value, by:

if a mode index comprised in said compressed pixel block indicates a first mode:

determining, based on said minimum reference property value and said maximum reference property value, a first quantization parameter applicable in a predefined sub-interval of an interval from said minimum reference property value to said maximum reference property value; and determining, based on said minimum reference property value and said maximum reference property value, a second, different quantization parameter applicable in a remaining portion of said interval; and if said mode index indicates a second mode, determining one quantization parameter based on said minimum reference property value and said maximum reference property value;

determining at least one step parameter based on said at least one quantization parameter; and defining at least one additional reference property value based on said at least one step parameter and at least one of said minimum reference property value and said maximum reference property value, to thereby determine a reference set that comprises said minimum reference property value, said maximum reference property value, and said at least one additional reference property value;

determining, for at least one pixel of said multiple pixels, a prediction error based on an encoded representation of said prediction error associated with said at least one pixel and comprised in said compressed pixel block;

providing a prediction of a value index of said at least one pixel based on a value index assigned to at least one neighboring pixel in said pixel block; calculating said value index of said at least one pixel based on said prediction error and said prediction; and providing, based on said value index of said at least one pixel, a reference property value from said reference set as a decoded representation of an original property value of said at least one pixel.

6. The method according to claim 5, wherein providing a prediction of a value index of said at least one pixel comprises:

calculating said prediction based on a first weighted combination of a value index of a first neighboring pixel in said pixel block and a value index of a second neighboring pixel in said pixel block if a magnitude difference between said value indices of said neighboring pixels is smaller than a threshold; and selecting, if said magnitude difference is not smaller than said threshold, said prediction to be based on one of a second different, weighted combination of said value indices of said neighboring pixels and a third different, weighted combination of said value indices of said neighboring pixels, said selection being based on a guiding bit associated with said at least one pixel and comprised in said compressed pixel block.

7. A block compressor for compressing a pixel block comprising multiple pixels, each pixel having a property value, said block compressor comprising:
   a reference value determiner configured to determine a minimum reference property value and a maximum reference property value based on at least a portion of said property values of said multiple pixels;
   a distribution determiner configured to determine a distribution of said property values of said multiple pixels in an interval from said minimum reference property value to said maximum reference property value, and to determine a mode index based on said distribution of said property values in said interval;
   a quantization determiner configured to determine at least one quantization parameter based on said minimum reference property value and said maximum reference property value, by:
      if said mode index indicates that at least a minimum portion of said property values of said multiple pixels is within a predefined sub-interval:
         determining, based on said minimum reference property value and said maximum reference property value, a first quantization parameter applicable in said predefined sub-interval; and
         determining, based on said minimum reference property value and said maximum reference property value, a second, different quantization parameter applicable in a remaining portion of said interval, and
      if said mode index indicates that said at least a minimum portion of said property values of said multiple pixels is not within said predefined sub-interval, determining one quantization parameter based on said minimum reference property value and said maximum reference property value,
   a step determiner configured to determine at least one step parameter based on said at least one quantization parameter;
   a reference value definer configured to define at least one additional reference property value based on said at least one step parameter and at least one of said minimum reference property value and said maximum reference property value, to thereby determine a reference set that comprises said minimum reference property value, said maximum reference property value, and said at least one additional reference property value;
   an index assigner configured to assign, for each pixel of said multiple pixels and based on a property value of said pixel, a value index associated with a reference property value of said reference set;
   a prediction provider configured to provide, for at least one pixel of said multiple pixels, a prediction of said value index assigned to said at least one pixel based on said value index assigned to at least one neighboring pixel in said pixel block;
   an error calculator configured to calculate a prediction error based on said value index assigned to said at least one pixel and said prediction of said value index; and
   a representation generator configured to generate an encoded representation of said prediction error, to determine a compressed pixel block that comprises said encoded representation of said prediction error, an encoded representation of said minimum reference property value, an encoded representation of said maximum reference property value, and said mode index.

8. The block compressor according to claim 7, wherein said index assigner comprises, for assigning a value index to each pixel of said multiple pixels:
   a difference calculator configured to calculate a value difference between said property value of said pixel and one of said minimum reference property value and said maximum reference property value; and
   an index determiner configured to determine said value index based on said value difference and said step parameter.

9. The block compressor according to claim 7, wherein said prediction provider comprises, for providing a prediction of the value index assigned to at least one pixel:
   a prediction calculator configured to calculate said prediction based on a first weighted combination of a value index assigned to a first neighboring pixel in said pixel block and a value index assigned to a second neighboring pixel in said pixel block, employing non-zero weights if a magnitude difference between said value indices of said neighboring pixels is smaller than a threshold;
   a prediction selector configured to select said prediction to be based on one of a second different, weighted combination of said value indices of said neighboring pixels and a third different, weighted combination of said value indices of said neighboring pixels if said magnitude difference is not smaller than said threshold; and
   a bit provider configured to provide a guiding bit associated with said selected one of said second weighted combination and said third weighted combination if said magnitude difference is not smaller than said threshold.

10. The block compressor according to claim 9, wherein said prediction provider further comprises a difference calculator configured to calculate a first difference between said second weighted combination and said value index assigned to said at least one pixel, and to calculate a second difference between said third weighted combination and said value index assigned to said at least one pixel, and wherein said prediction selector is configured to select said prediction based on said first difference and said second difference.

11. A block decompressor for decompressing a compressed pixel block constituting an encoded representation of a pixel block, the pixel block comprising multiple pixels, said block decompressor comprising:
   a reference value provider configured to provide a minimum reference property value and a maximum reference property value based on an encoded representation of said minimum reference property value and an encoded representation of said maximum reference property value comprised in said compressed pixel block;
   a mode identifier configured to investigate a mode index comprised in said compressed pixel block;
   a quantization determiner configured to determine at least one quantization parameter based on said minimum reference property value and said maximum reference property value, by:
      if the mode index indicates a first mode:
         determining, based on said minimum reference property value and said maximum reference property value, a first quantization parameter applicable in a predefined sub-interval of an interval from said minimum reference property value to said maximum reference property value; and determining, based on said minimum reference property value and said maximum reference property value, a second, different quantization parameter applicable in a remaining portion of said interval; and if the mode index indicates a second mode, determining one quantization parameter based on said minimum reference property value and said maximum reference property value;

a step determiner configured to determine at least one step parameter based on said at least one quantization parameter;

a reference value definer configured to define at least one additional reference property value based on based on said at least one step parameter and at least one of said minimum reference property value and said maximum reference property value, to thereby determine a reference set that comprises said minimum reference property value, said maximum reference property value and said at least one additional reference property value;

an error determiner configured to determine, for at least one pixel of said multiple pixels, a prediction error based on an encoded representation of said prediction error associated with said at least one pixel and comprised in said compressed pixel block;

a prediction provider configured to provide a prediction of a value index of said at least one pixel based on a value index assigned to at least one neighboring pixel in said pixel block;

an index calculator configured to calculate said value index of said at least one pixel based on said prediction error and said prediction; and a value provider configured to provide, based on said value index of said at least one pixel, a reference property value from said reference set as a decoded representation of an original property value of said at least one pixel.

12. The block decompressor according to claim 11, wherein said prediction provider comprises, for providing a prediction of a value index of said at least one pixel:

a prediction calculator configured to calculate said prediction based on a first weighted combination of a value index of a first neighboring pixel in said pixel block and a value index of a second neighboring pixel in said pixel block if a magnitude difference between said value indices of said neighboring pixels is smaller than a threshold; and a prediction selector configured to select, if said magnitude difference is not smaller than said threshold, said prediction to be based on one of a second different, weighted combination of said value indices of said neighboring pixels and a third different, weighted combination of said value indices of said neighboring pixels, said selection being based on a guiding bit associated with said at least one pixel (and comprised in said compressed pixel block.

\* \* \* \* \*